United States Patent [19]
Howard

[11] 3,924,578
[45] Dec. 9, 1975

[54] ROTARY INTERNAL COMBUSTION ENGINE

[76] Inventor: Donald E. Howard, 3382 Aletha Drive, Baton Rouge, La. 70814

[22] Filed: Mar. 1, 1974

[21] Appl. No.: 447,283

[52] U.S. Cl.............................. 123/8.13; 123/8.27
[51] Int. Cl.² ........................................ F02B 53/04
[58] Field of Search ....... 123/8.27, 8.31, 8.29, 8.13, 123/8.05

[56] References Cited
UNITED STATES PATENTS

| | | | |
|---|---|---|---|
| 866,466 | 9/1907 | Higbee............................. | 123/8.33 |
| 1,119,699 | 12/1914 | Houser............................. | 123/8.33 |
| 1,846,298 | 2/1932 | Alcznauer......................... | 123/8.27 |
| 1,976,042 | 10/1934 | Skouland ......................... | 123/8.31 |
| 2,172,039 | 9/1939 | Shore............................... | 124/8.27 |
| 3,809,020 | 5/1974 | Takitani........................... | 123/8.45 |

FOREIGN PATENTS OR APPLICATIONS

| | | | |
|---|---|---|---|
| 116,601 | 6/1918 | United Kingdom.............. | 123/8.27 |
| 1,093,421 | 5/1955 | France............................. | 123/8.27 |
| 265,220 | 11/1927 | United Kingdom.............. | 123/8.27 |
| 1,910,184 | 9/1970 | Germany .......................... | 123/8.27 |

*Primary Examiner*—William L. Freeh
*Assistant Examiner*—O. T. Sessions
*Attorney, Agent, or Firm*—Llewellyn A. Proctor

[57] ABSTRACT

A rotary internal combustion engine of novel design for the intake and combustion of fuel, air, various other components and admixtures to provide more efficient utilization of fuel, as well as a cleaner burning engine. The engine comprises the combination of stator, rotor, annular chambers between the inside wall of the stator and external wall of the rotor, fuel input and gas exhaust means. In its function, it includes the usual stages of fuel intake, fuel compression, fuel ignition and exhaust. Distinctive structure, however, provides for the intake of multiple fuels and fuel components, recycle and reburning of previously burned fuel, and minor feed chambers. A feature of the engine relates to the design of the firing chamber which permits rapid initial expansion of the ignited fuel to moderate and control the temperature of burning to suppress the formation of nitrous oxides, with subsequent decrease in the volume rate of expansion of the chamber to sustain and control the temperature of burning to enhance a more complete combustion, with subsequent increase in the area of force recipient through an elongated section to improve energy utilization.

21 Claims, 18 Drawing Figures

LEGEND
→←or ⇉⇇ - COMPRESSION
✳ - FIRING
←→ or ↕ - EXPANSION

LEGEND
→←OR →*← —COMPRESSION
* —FIRING
←→OR ↕ —EXPANSION

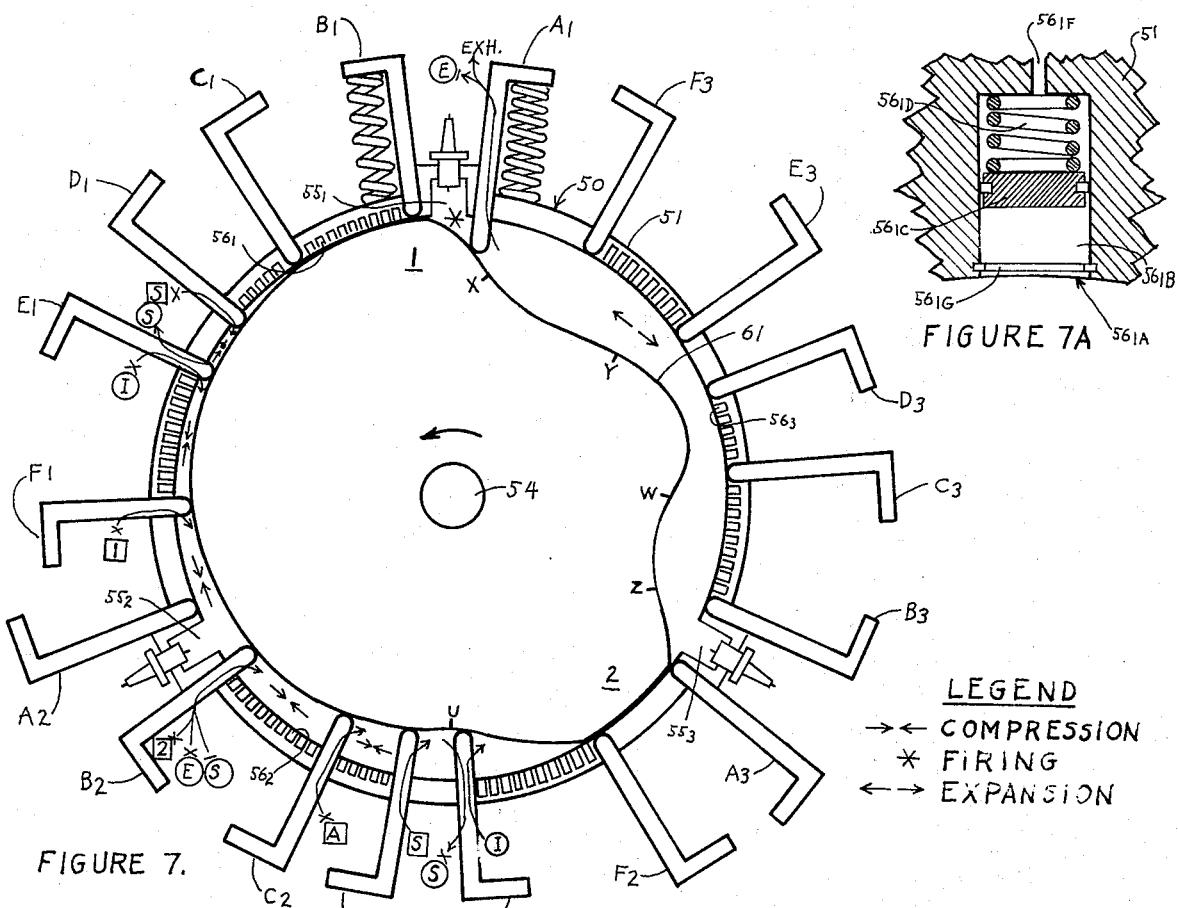
FIGURE 7.
FIGURE 7A
LEGEND
→← COMPRESSION
* FIRING
←→ EXPANSION
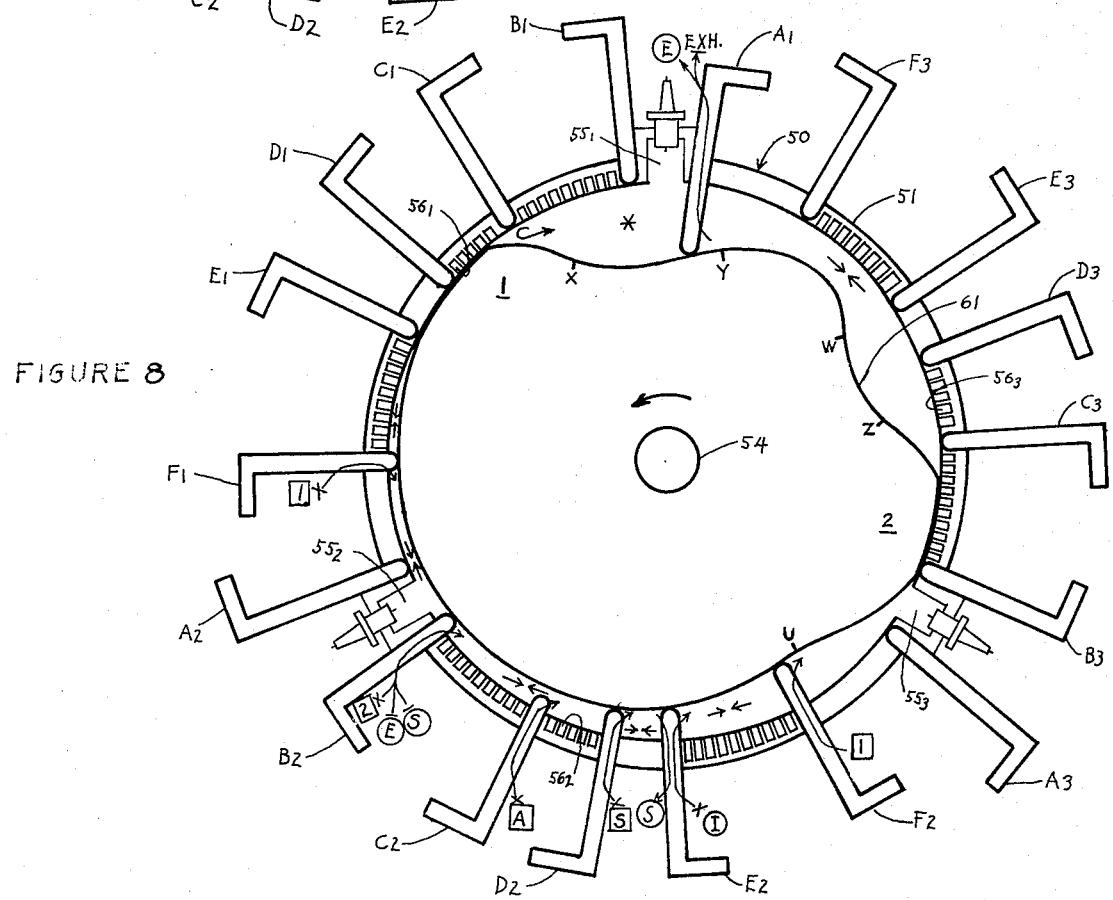
FIGURE 8

LEGEND
→← COMPRESSION
* FIRING
←→ EXPANSION

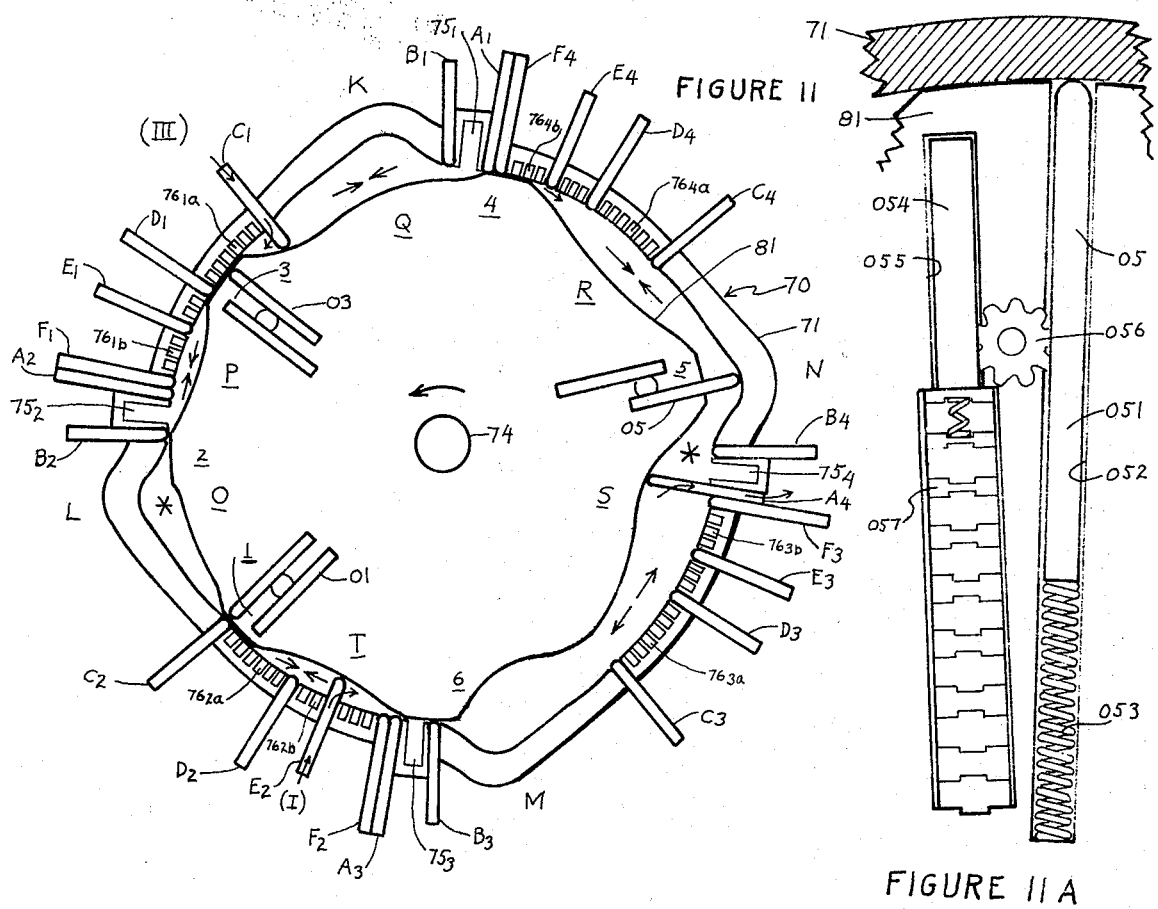
FIGURE 11
FIGURE 11A
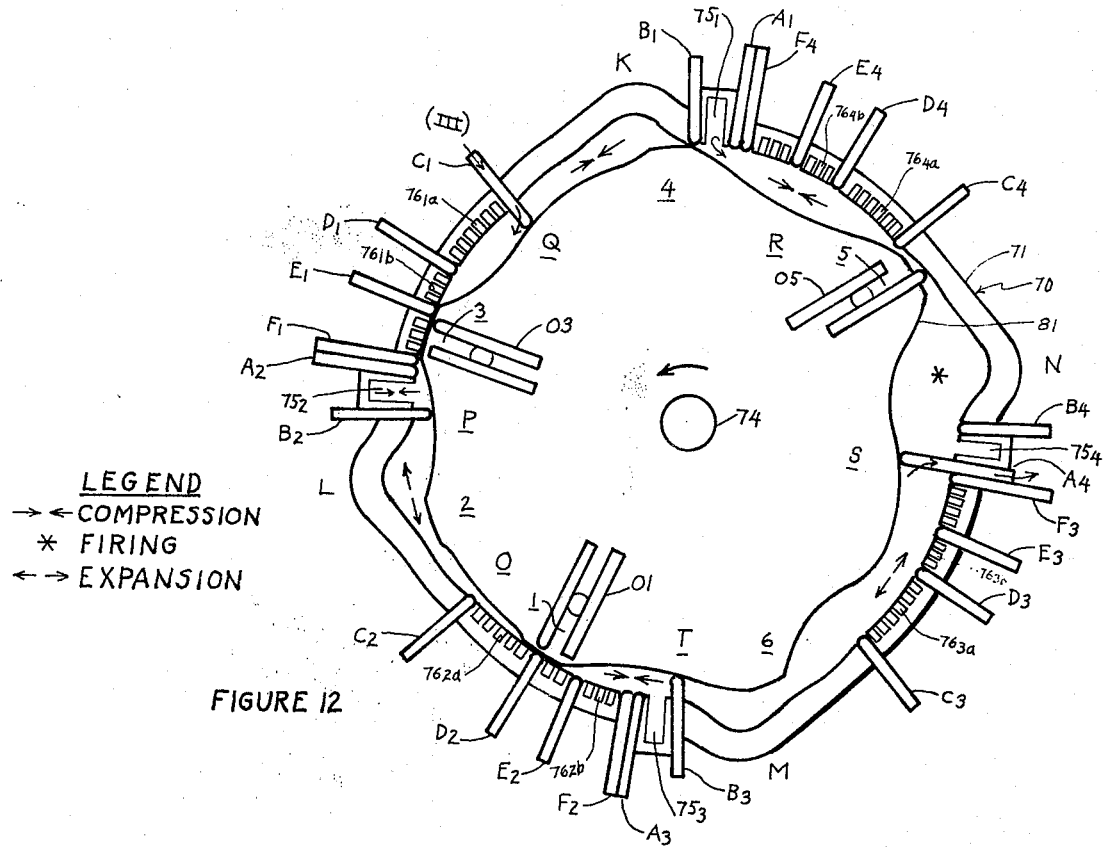
LEGEND
→ ← COMPRESSION
* FIRING
← → EXPANSION
FIGURE 12

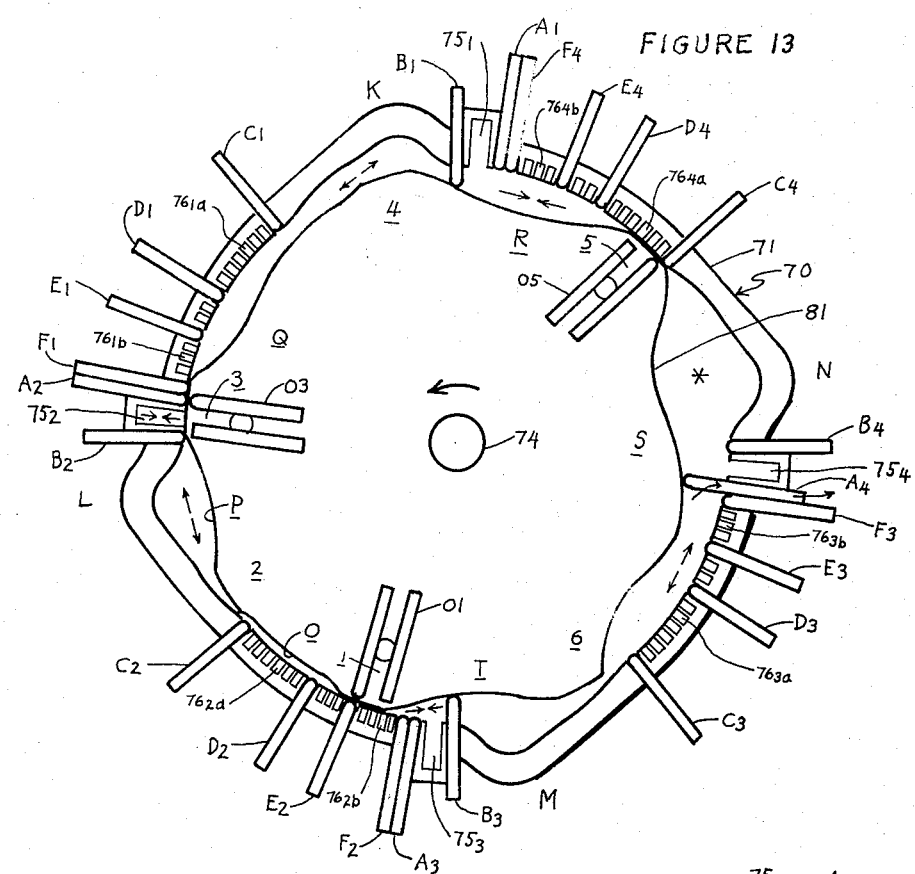
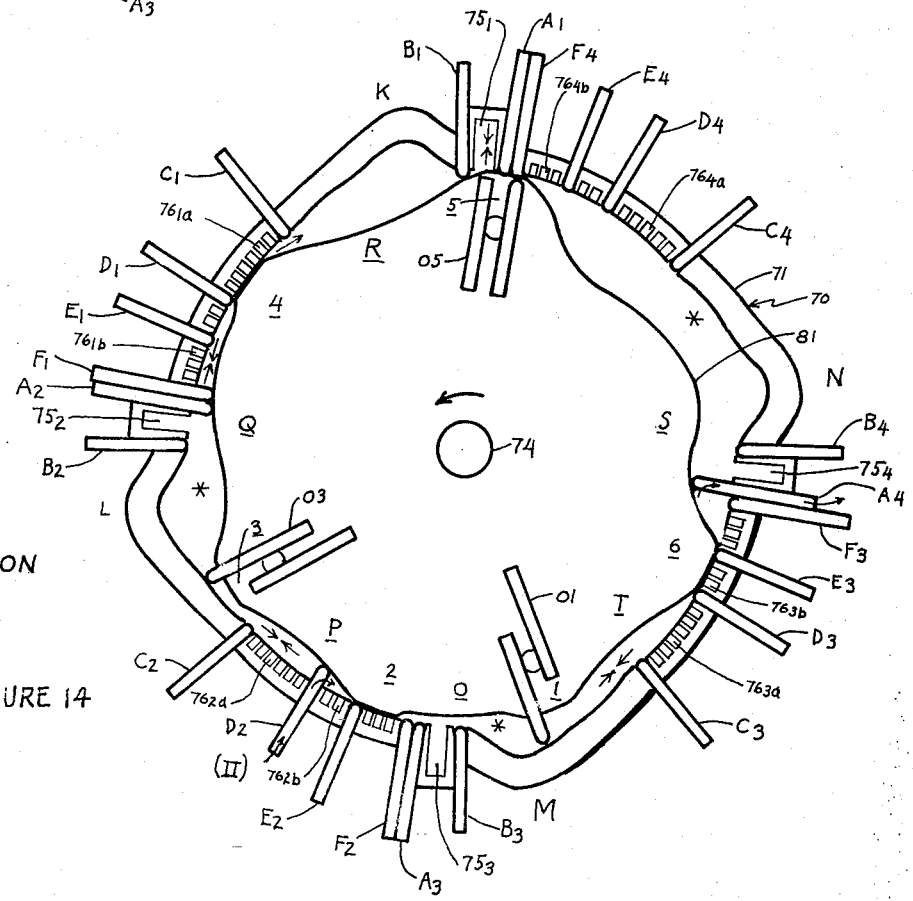

ROTARY INTERNAL COMBUSTION ENGINE

Internal combustion engines, or engines of various types wherein a combustible fuel-air mixture is burned so that the hot gaseous products of the combustion exert a force on the moving parts of the engine for the performance of useful work and generation of power have been known for many, many years. Reciprocating piston type engines are the best known, and these have been widely used in automobiles. In such engines, pistons operatively connected to a crankshaft are reciprocated within cylinders within which they are mounted, by expanding burning gases, such that the crankshaft is rotated to deliver power. These are primarily four-stroke engines wherein a cycle of operation is performed by (1) intake of fuel by suction during an instroke of the piston, (2) compression attained by an outstroke of the piston, (3) power attained by ignition of the fuel charge and expansion of the burning fuel during an instroke of the piston, and (4) exhaust of the burned gases during the next outstroke of the piston. A notable deficiency of such engines is that only about one-fourth of the available energy does useful work. Heat losses are quite acute. About three-eighths of the available energy is lost as heat through the exhaust, and about an equal amount is lost due to the necessity of cooling the engine. Another deficiency results because the fuel intake, compression, power and exhaust strokes all require the same volume change as a piston traverses its cylinder in accomplishing its function. Because of these and various other deficiencies of piston type engines, considerable effort is now underway to replace these engines by new designs.

Rotary internal combustion engines are most often suggested for replacement of piston type engines. Most of these embody an enclosing cylindrical casing, usually a fixed member or stator, containing a movable member or rotor which revolves and imparts motion to an affixed drive shaft. The rotor may or may not be eccentrically mounted. These engines are operated on the principle that as the rotor revolves within the stator, chambers are periodically formed within the annulus between the stator and rotor in which a fuel-air mixture is combusted or fired to generate gases which drive the rotor and impart power to the affixed drive shaft. These engines, besides the power stroke, also require intake, compression and exhaust strokes to complement their operating function. Rotary engines, like their piston type predecessors, despite their apparent relative simplicity, have certain disadvantages and, thus far, only one has achieved wide commercial automotive use.

A notable deficiency of rotary engines is that, like their piston type counterparts, the chambers which are periodically formed within the annulus between the stator and rotor provide the same volume for intake, compression, power and exhaust strokes. The firing chamber is thus the same volume and generally of the same design as the chambers formed and employed for effecting intake, compression and exhaust. These relationships are not selected to achieve maximum efficiency consistent with the goal of operating a clean engine. The firing chamber almost invariably operates at too high a temperature such that nitrous oxides are formed by oxidation of the nitrogen introduced with the air, the only practical source of oxygen, thus constituting a hazard to health. Additionally, the gases are rarely, if ever, burned as completely as would be desirable to achieve maximum efficiency, and avoid pollution of the environment.

It is accordingly the primary objective of the present invention to provide a new and novel rotary internal combustion engine which will obviate these and other prior art deficiencies.

A specific objective is to provide a novel rotary engine wherein the firing chamber is of generally optimum design for suppression of nitrous oxide formation, for enhancement of a more complete combustion, and for greater utilization of the energy produced, and can differ in volume from that of the other chambers.

A further objective is to provide an engine of such type wherein burned fuels can be recycled for further, more complete burning, and means are provided for multiple intake of various fuels and other additives, particularly additives for decreasing heat losses within the engine, for use ab initio or for admixture.

These and other objects are achieved in accordance with the present invention which comprises a rotary engine wherein is included the combination of an outer casing, generally a fixed member, or stator, formed by an enclosing wall within which is coaxially mounted an inner member, generally a rotatable member, or rotor. In either event, it is essential that one member rotate relative to the other. One member, or both members, is provided with a plurality of pistons, lobed surfaces, or areas which provide sealed contact between the stator and rotor, the areas of contact being separated one from another to provide separate chambers within the annulus between the stator and rotor within which essential engine functions involving fuel intake, fuel compression, firing and exhaust of spent gases are carried out. The contour of the firing chamber provides for selected changes in the rate of volume expansion of the gases within the firing chamber to control and moderate temperatures and achieve maximum force from the pressures produced, and desirably its relationship with the intake, compression and exhaust chambers is selected to achieve maximum efficiency consistent with the goal of providing a clean engine. The rotor is mounted on an output shaft journalled upon the stator.

In the preferred form of the engine, the stator constitutes the outer casing, and it is generally of substantially cylindrical shape except as relates to ante-chambers, primary firing chambers, main firing chambers, bypass chambers, or mixing chambers, arranged about its circumference. In any form, the stator includes a plurality of ante-chambers constituting primary firing chambers, preferably symmetrically arranged along the circumference of the stator. A plurality of gate pairs, one each of a pair of the gates, are located on a side of a primary firing chamber. The gates are separately extensible into the annular chambers formed between the areas of contact between the external surface of the rotor and the internal surface of the stator, and retractable therefrom, in timed sequence. Input means, generally in the form of inlets arranged within the gates themselves, provide means for the introduction of a fuel, or fuels, and other components into the engine, often for admixture with recycle gases or for transfer to other portions of the engine. Outlet means, generally in the form of outlets arranged within the gates themselves, provide means for the exhaust of burned fuel, and recycle of burned fuel suitable, if desired, for admixture with fresh fuel, or provide means for transfer to other portions of the engine. Recesses or minor chambers are preferably located within the inside wall of the stator, such minor chambers being particularly useful for feeding incremental quantities of fuel into a burning mixture to sustain firing, to control temperature, for recycle of gases, or for mixing.

These and other characteristics of preferred rotary internal combustion engines, and the principle of their operation, will be more fully understood by reference to the following detailed description. Similar letters and numbers are used to represent similar parts or components in different figures, and subscripts are used with a given letter or whole number to designate a plurality of generally analogous parts or components. Where the subscripts are dropped from letters in a general discussion, subsequent to their introduction, the designations are intended to apply in generic sense.

In the drawings:

FIG. 1 is a cross-sectional view of a preferred type of internal combustion rotary engine which encompasses generally a rotor affixed upon a shaft, rotatably mounted within a stator and rotatable as power is transmitted to the rotor via controlled combustions which take place within chambers formed within the annulus between the external surface of the rotor and internal surface of the stator. The figure is symmetrical on opposite sides an axis through the shaft, the bottom portion of the figure being omitted in part to provide clarity for the portion of the figure depicted.

FIGS. 7 through 10 depict a series of views of a particularly preferred type of multiple intake engine, these views describing an engine cross-section both as regards the structure and function of such engine, the views being depicted in partially schematic fashion for purposes of clarity.

FIGS. 11 through 14 depict a series of view of an especially preferred type of multiple firing engine, the views describing the cross-section of such engine both as relates to structure and as relates to function, these series of views, too, being shown in partially schematic fashion for purposes of clarity.

Figure 1:
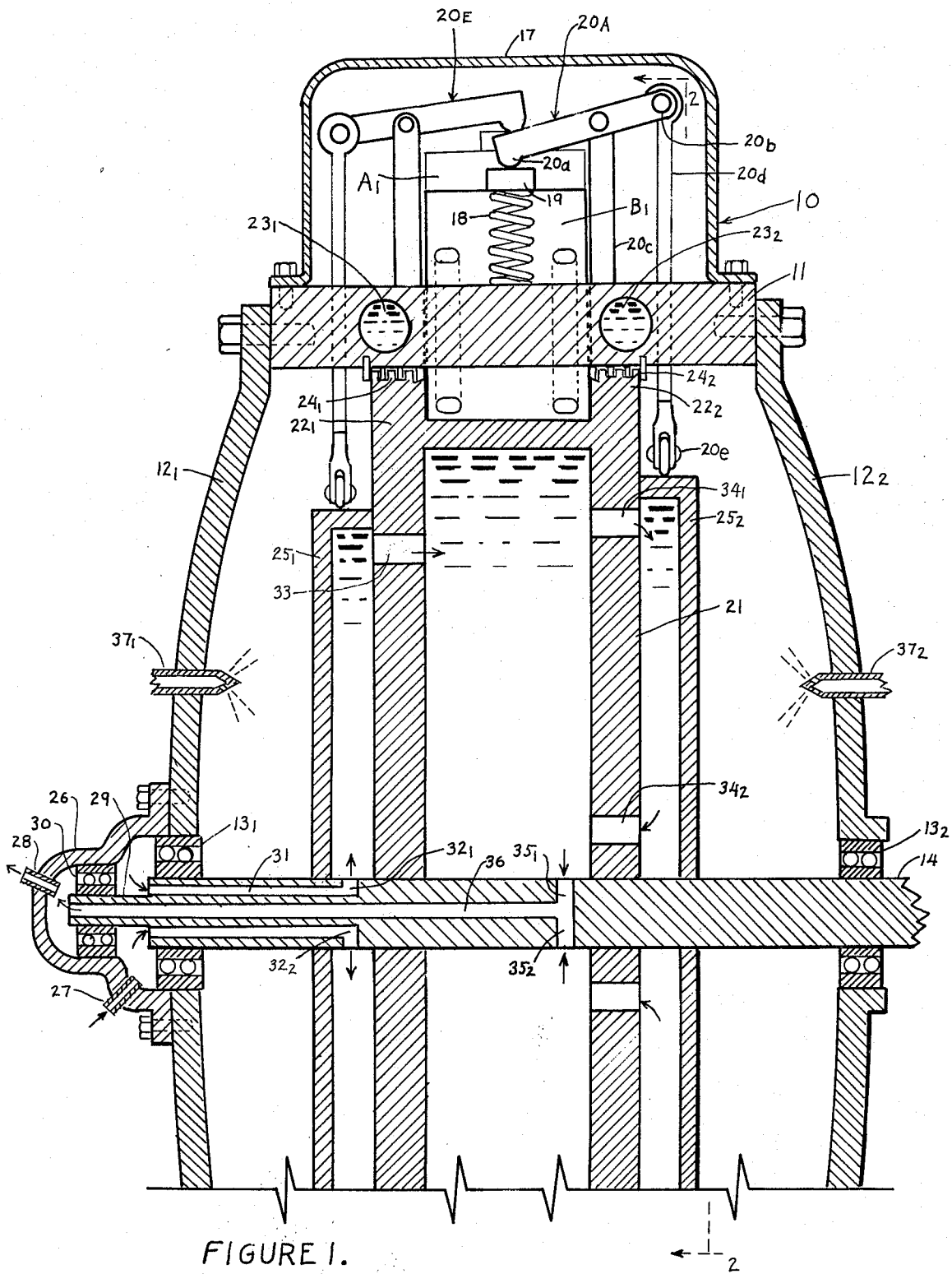
Figure 2:
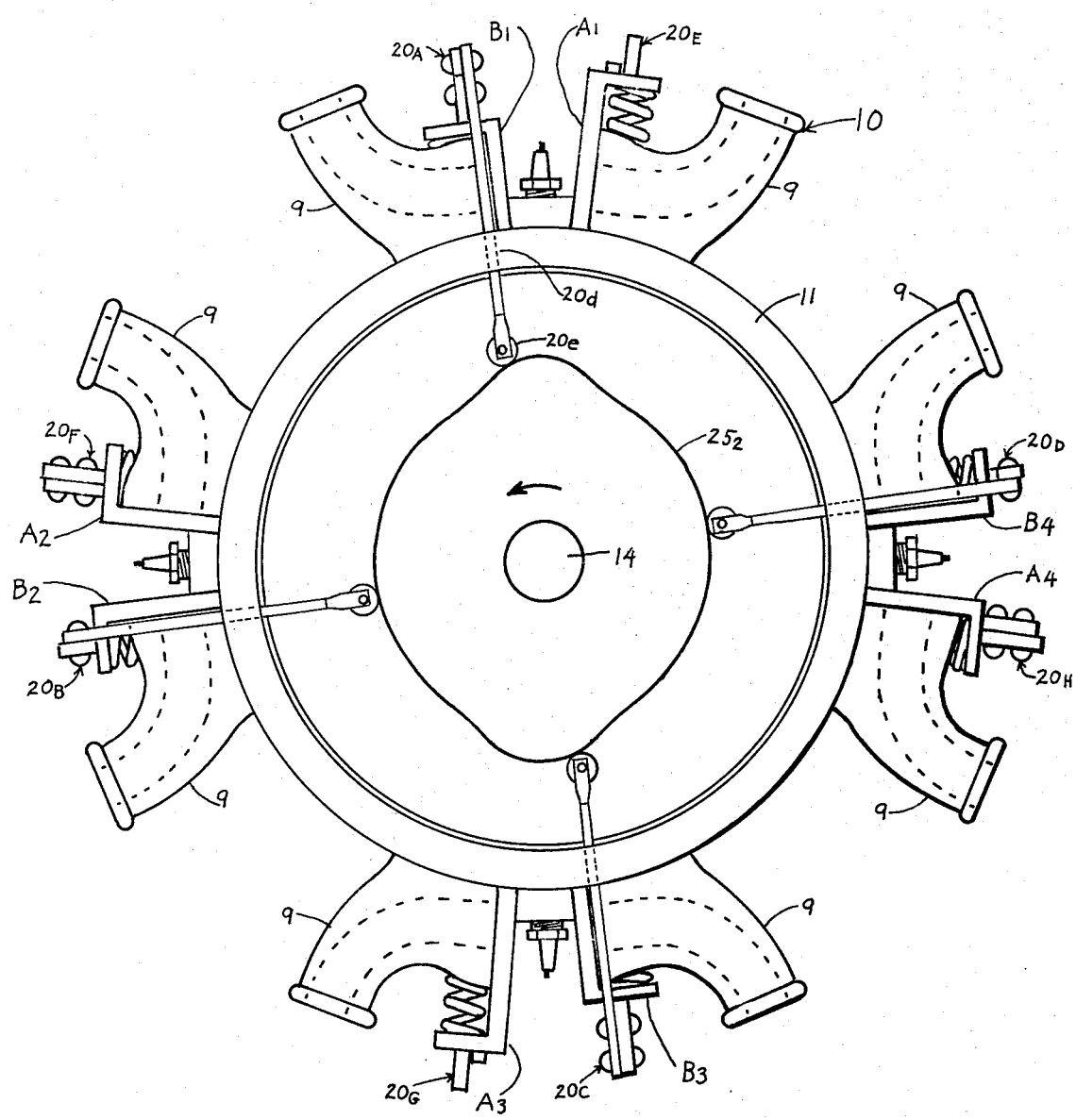
FIG. 2 is a section taken through section 2—2 of FIG. 1, the omitted lower portion of FIG. 1 being shown for purpose of clarity. The view depicts the operation of a particular set of gates in timed sequence, as necessary to carry out the functions of the engine.

Referring generally to FIGS. 1 through 6 of the drawings, there is described an internal combustion rotary engine 10 which constitutes a preferred embodiment of the present invention. The rotary engine 10, as best shown by initial reference to FIGS. 1 and 2, includes a cylindrical casing or stator 11 with stationary enclosing end walls or plates $12_1$, $12_2$ attached via appropriate means, e.g., bolts, to the stator. The end plates $12_1$, $12_2$ are provided with bearing boxes $13_1$, $13_2$ within and through which is mounted, or journalled, a shaft 14. A rotor 21, provided with thick end walls or flanges $22_1$, $22_2$, is affixed upon the shaft 14 and rotates therewith as shaft 14 turns within bearing boxes $13_1$, $13_2$. Gate pairs $A_1B_1$, $A_2B_2$, $A_3B_3$, $A_4B_4$, four in number in this particular embodiment as best illustrated by specific reference to FIG. 2 (or FIGS. 3 through 6), are slidably mounted within sealed slots or openings located about the circumference of cylindrical shaped inner wall of the stator 11 for abuttment and peripheral contact, at desired intervals, with the external surface of the intermediate cylindrical wall of the rotor 21. All of the peripheral components are housed within an enclosing wall or shell 17. The gate pairs lie between the flanged end portions $22_1$, $22_2$ of the rotor 21, the peripheral edges of which flanged walls ride in sealed contact against inner wall of the stator 11. The seals $24_1$, $24_2$ prevent leakage of gas from chambers located within the annulus between the internal surface of the stator 11 and the external surface of the rotor 21, as defined by depressions and contours within the external surface of the rotor 21 between rotor and stator contact areas, conveniently termed "lobes". It will thus be observed that the rotor contact surfaces or lobes, four in number in this particular embodiment and numbered for convenience 1 through 4, ride in contact with the inner surface or inside face of the cylindrical wall of the stator 11, and that a plurality of chambers, four in number in this particular embodiment, are defined between adjacent contact surfaces or lobes. A feature of this invention is that the contour of these chambers, particularly the contour of the firing chamber, or chambers, can be optimized, as desired, thus regulating the rate of volume change, and for convenience these chambers shall be referred to as main chambers. The engine also contains ante-chambers leading into the main chambers, equal in number, in this particular embodiment, to the number of main chambers (in this instance four in number), these constituting primary compression and firing chambers $15_1$, $15_2$, $15_3$, $15_4$. Each chamber 15, of course, is generally provided with ignition means, e.g., a spark plug, and suitable ignition system (not shown) for igniting a combustible fuel. In an optional but preferred embodiment, the face of the cylindrical wall of stator 11 contains a plurality of sets of recesses, or minor chambers, $16_1$, $16_2$, $16_3$, $16_4$, the function of which is to add increments of fuel or fuel mixtures to a main chamber and sustain combustion at a preferred rate, and to recycle spent fuel or exhaust and effect more complete burning of the fuel. In its preferred form, the several chambers of this embodiment, and all other embodiments of the present invention, which are formed within the annulus between the lobes, the external wall surface of the rotor 21 and the inner face of the wall of the stator 11, the contour of the main firing chamber (or chambers) is optimized to provide for regulating the rate of change of volume expansion of the gases, and the other main chambers are designed to have the same or different contours, usually a different contour, or contours.

Input means are provided for addition of fuel, air, and other components (if desired) into the main chambers of the engine, and exhaust means for removal of burned gases from the engine. In a preferred embodiment, both the input and exhaust means are provided within the gates themselves. Suitably, as illustrated by reference to FIGS. 1 through 6, the A gates are provided with channel communications which, when the A gates are extended into a main chamber which performs a firing and exhaust function, burned fuels egress from the portion of the chamber performing the exhaust function. When, on the other hand, the B gates are extended into a main chamber which performs an intake and compression function, fresh fuel is fed via channels contained therein into the portion of the chamber performing the intake function. It will thus be observed, by specific reference to FIG. 2, that an intake and exhaust mainfold 9 is associated with each of the A and B gates, respectively.

The outer faces of the rotor end walls $22_1$, $22_2$, it will be observed, are provided with gate activating grooves or surfaces, in this instance peripheral surfaces of cams $25_1$, $25_2$. Cams $25_1$, $25_2$ are of cross-section shaped to achieve the desired time sequence for activation of the A gates and B gates, respectively, as the rotor 21 is rotated. Since all of the gates are extended and retracted by similar mechanisms, differing only in the contour desired to produce the desired time sequence of operation of the gates, direct reference being made in particular to the operation of only the B gates, initial reference being made in particular to the operation of gate $B_1$ as described by FIGS. 1 and 2, particularly the latter. The A gates are thus normally spring biased via helical springs which hold the gates in retracted position (i.e., positioned outside the main chambers) until extended (i.e., thrust into a firing and exhaust main chamber) by a bell crank mechanism 20 by cam $25_1$ in timed sequence, as occurs on rotation of rotor 21. The B gates are similarly spring biased in a retracted position outside the main chambers until extended into an intake and compression main chamber via the positive action of cam $25_2$. Suitable actuating means known to the art, e.g., a cam $25_1$, thus activates bell crank mechanisms 20E, 20F, 20G, 20H and cam $25_2$ activates bell crank mechanisms 20A, 20B, 20C, 20D, the operation of the latter being shown for convenience by specific reference to FIGS. 1 and 2.

Referring primarily to FIG. 1, it will be observed that a helical spring 18 is located between a well 19 located beneath an extended top or upper shank portion of a gate $B_1$, and a recess or indentation, if desired, within the external surface of the enclosing cylindrical wall 11. One terminal end $20_a$ of the horizontal lever portion of a bell crank mechanism 20A thus rests atop a gate shank while the other end, $20_b$, is pivotally attached to a vertically oriented rod $20_d$. The ends $20_a$, $20_b$ are pivotally located, one with regard to the other, by virtue of the fulcrum created by pivotal attachment of the said horizontal lever via its mid-portion to a fixed post $20_c$. The roller end $20_e$ of rod $20_d$ rests and rides upon a cam $25_2$. At the particular instant shown, gate $B_1$ is extended into a chamber, and cam $25_2$ has positioned the bell crank mechanism 20A such that the roller end $20_e$ of the bell crank mechanism 20A is in or near its maximum upward position, resting upon a bulged portion of the cam $25_2$. This has caused helical spring 18 to become compressed such that the gate $B_1$ (and gate $B_3$) is extended (positioned inside a main chamber). At this time, the helical springs of gates $B_2$, $B_4$ are uncompressed and the gates are retracted. Conversely, in any event, it is apparent that the lowering of roller end $20_e$ as by further partial counterclockwise rotation of rotor 21 will cause the rod $20_d$ to be cammed downwardly as it enters onto the low contour portion of the cam $25_2$ such that the end $20_a$ will be moved upwardly (by pivoting about the shaft $20_c$) to release pressure on spring 18 such that it will be decompressed and gate $B_1$ (and $B_3$) retracted. In identical manner, gates $B_2$ and $B_4$ will be extended, then retracted, upon further partial counterclockwise rotation of cam $25_2$, as the roller ends of bell crank mechanisms $20_B$, $20_D$ are cammed outwardly, then inwardly, by the bulged portions of cam $25_2$. Gates $B_1$ and $B_3$, on the one hand, and gates $B_2$ and $B_4$, on the other hand, are thus operated in alternate sequence, one gate relative to another, by the shaped cam $25_2$ which activates bell crank mechanisms 20A, 20B, 20C, 20D in timed sequence as rotor 21 is rotated. The A gates, i.e., gate $A_1$, $A_2$, $A_3$ and $A_4$, as will be apparent, are similarly operated in a timed sequence by cam $25_1$, located on the opposite side of the rotor 21, the contour of the latter cam (corresponding to the cross section of the rotor) being shaped to provide the desired sequence of gate actuations in a time span based on a single complete, or 360° revolution, of the rotor 21.

The engine 10, as best shown by reference to FIG. 1, is liquid-cooled, and provided with means for circulation of a cooling liquid, e.g., water, within the rotor 21. An enclosing water jacket 26 is thus located at the hub of the axle 14, the water jacket 26 being provided with an inlet 27 and an outlet 28. The axle 14 is provided with an extending tubular shank portion 29 fitted within a bearing box 30 which also serves to partition the jacket 26 into inlet and outlet chambers, adjacent and adjoining inlet and outlets 27, 28. Cooling water introduced via inlet 27 passes through annular channel 31 into the cam $25_1$ and enters via openings or perforations $32_1$, $32_2$ and via opening 33 into the interior of rotor 21. Cooling water is circulated through cam $25_2$ via inlet $34_1$, and outlet $34_2$. The heated water egresses via openings $35_1$, $35_2$ into channel 36 and through axle 14, and is discharged via outlet 28. The heated water can be radiated and recooled by conventional means, not shown, and recirculated. A cooling medium can also be circulated within the stator 11, via cooling means $23_1$, $23_2$, if desired.

The engine 10 is lubricated by the introduction of oil, of suitable grade and quality, via inlets $37_1$, $37_2$ and at other convenient locations, not shown. Distribution of the oil is aided by the centrifugal force generated by the revolving rotor 21 which disperses the oil radially outwardly in all directions.

In all forms of the present invention, the design of the chamber (or chambers) wherein firing takes place, i.e., the "firing chamber," is optimized to provide controlled expansion of the burning gases, at lower than conventional pressures, to maintain the temperature of the combusting mixture sufficiently low to suppress formation of nitrous oxides, normally formed at high temperatures, from the nitrogen of the air added with the fuel to support combustion. In initial combustion within a firing chamber, the temperature of the burning fuel undergoes a rapid rise and, accordingly, the design of the firing chamber is such that the volume thereof is rapidly expanded to suppress excessive temperature. After the initial expansion, and the temperature is moderated and brought under control, the design of the firing chamber is such that its rate of volume expansion is decreased. Thereafter, the change in rate of volume expansion may be further decreased, or again increased, consistent with the overall objective of controlling and moderating the temperature of combustion of the ignited fuel. The design of the firing chamber (or chambers) is further optimized to maintain a large area of force recipient through an extended arc of rotation after combustion has subsided.

The operation and function, and certain other features of this embodiment of the invention, are thus further described by specific reference to the sequence of views depicted in FIGS. 3 through 6. In brief compass, these figures thus show an engine cross-section with nonessential components omitted in whole or in part for clarity. Exhaust manifolds 9 are thus omitted, and input and output channels contained within the A and B gates are not shown when the gate is in retracted position, and the channel is not relevant to the specific description. The engine 10 includes generally a stator 11 and rotor 21 within the annulus (between the areas of contact between the inside wall of the stator 11 and external wall surface of the rotor 21) of which there is provided a plurality of main chambers within which fuel is combusted to impart thrust and thereby produce rotation of rotor 21 and shaft 14, to which it is affixed. This function is produced by concert between operations in the main chambers and functions produced by AB gate pairs. The gate, of a gate pair, first approached by a rotor contact area is termed, for convenience, an A gate ( and includes gates $A_1$, $A_2$, $A_3$ and $A_4$), while the other gate of a pair is termed a B gate (and includes gates $B_1$, $B_2$, $B_3$ and $B_4$). A and B gates are always paired. The A gates are termed firing and exhaust gates because, in an operating sequence, firing always occurs on one side of an extended A gate ( the gases expanding against the trailing face of a retreating lobe) while exhaust occurs on the other side of the gate (the gases being exhausted by the leading face of an advancing lobe). They remain operative and extended against the external surface of the rotor during the time when firing and exhaust functions are performed. When the A gate of a given gate pair is extended, the B gate of the pair is retracted. B gates are termed intake and compression gates, and are operative during the time when the compression and intake functions are performed. When the B gate of a given gate pair is extended, the A gate of the pair is retracted. The stator portion of the engine is also provided with primary firing chambers 15, i.e., $15_1$, $15_2$, $15_3$, $15_4$, each containing a conventional spark plug or other fuel ignition means, and multiple secondary feed chambers 16, i.e., sets of secondary chambers $16_1$, $16_2$, $16_3$, $16_4$.

Figure 3:
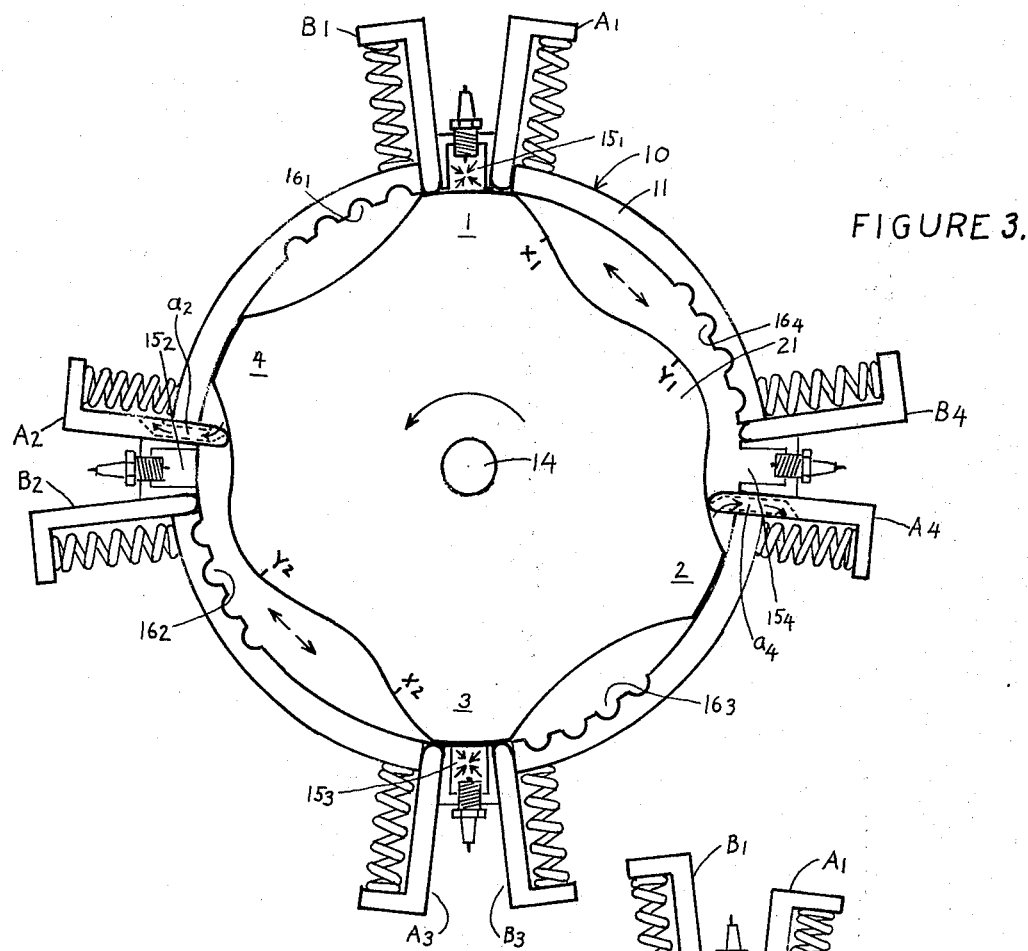
FIGS. 3 through 6 depict a series of views substantially representing cross-sections of the engine described by reference to FIGS. 1 and 2, with parts omitted for clarity of illustration. The sequence shows various relationships between the stator, rotor, chambers, and gates for purposes of illustrating an operating sequence.

Referring first to FIG. 3, for convenience the rotor 21 is initially described as positioned such that firing has now been discontinued, or completed in the chamber between contact areas 1 and 2, referred to hereafter for convenience as "lobes" 1 and 2, the unbalanced force caused by the pressure exerted by impingement of the burning gases against the trailing face of lobe 1 having produced an impulse causing counterclockwise rotation of rotor 21, lobe 1 having been thrust to a sector such that it covers primary firing chamber $15_1$ on each side of which lies a retracted gate $A_1$, $B_1$. At this particular point in time, it will be observed that fuel previously taken into the main chamber between lobes 1 and 4, and formerly compressed between lobe 1 and gate $B_1$ is now substantially contained within primary firing chamber $15_1$. This occurred as lobe 1 swept counterclockwise to compress the fuel against extended gate $B_1$, now retracted. At this moment, also, a volume expansion which previously occurred in the chamber between lobes 1 and 4 as lobe 4 moved away from gate $B_1$ producing an intake of fuel, has ended. Firing has also ended in the main chamber between lobes 3 and 4, and fuel has been compressed within primary firing chamber $15_3$ by the action of lobe 3 in concert with previously extended gate $B_3$.

Figure 4:
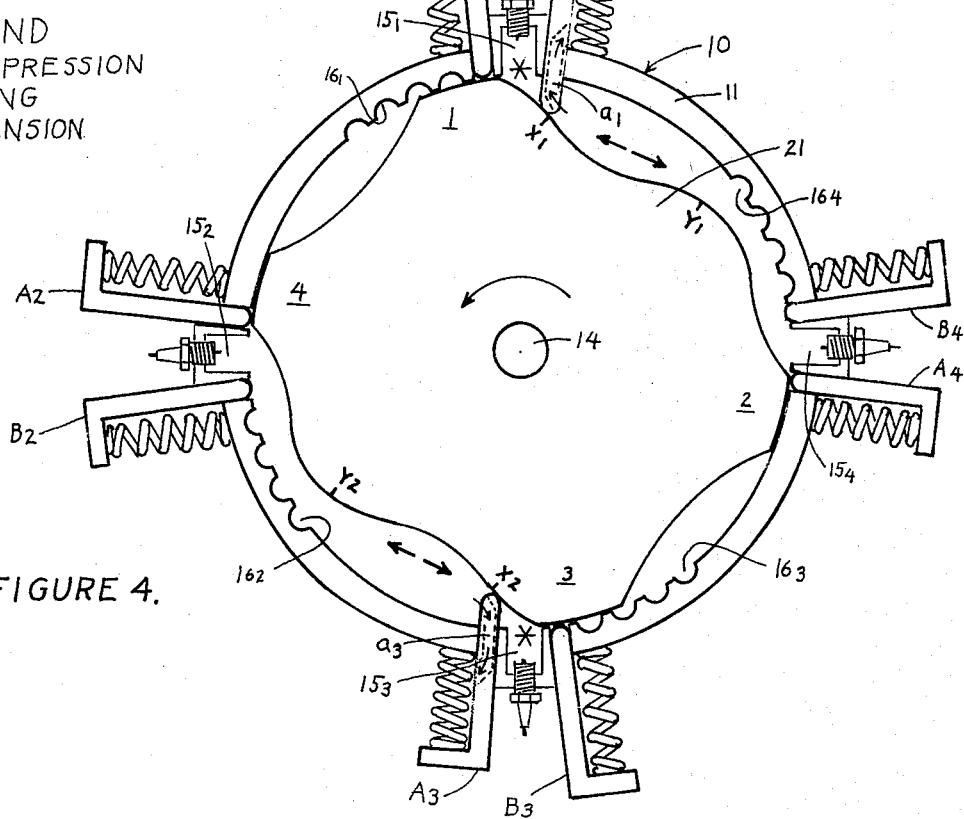

Referring to FIG. 4, as lobe 1 passes chamber $15_1$, gate $A_1$ is partially extended behind lobe 1, the outlet port $a_1$ of gate $A_1$ being opened so that spent gas egresses from the main chamber between gate $A_1$ and lobe 2. The gas within primary firing chamber $15_1$ is ignited behind lobe 1, and firing occurs (as indicated by a large asterisk). The burning gases rapidly expand and create a thrust against the trailing face of lobe 1 and the extended gate $A_1$ slidably affixed to stator 11, this causing rotation of the rotor 21 in counterclockwise direction. In this portion of the operation, it will be observed that rapid expansion of the firing chamber occurs, this tending to moderate the rapidly rising temperature of the burning fuel. The trailing face of lobe 1 and adjacent portion of the rotor located within the area of combustion is contoured to give a rapid increase in the surface area of gate $A_1$ exposed to the pressure force, and therefore an equal and opposite "effective" area on the trailing face of lobe 1. Spent gas is exhausted from the chamber located between lobe 4 and lobe 3 via the sweep of lobe 4 which compresses the gas against extended gate $A_3$ and causes the gas to egress via outlet port $a_3$ of gate $A_3$. Simultaneously, also, firing occur in primary firing chamber $15_3$, and the thrust of the gas expanding against the trailing face of lobe 3 and gate $A_3$ imparts thrust to continue the counterclockwise rotation of the rotor 21 as is occurring in firing chamber $15_1$.

Figure 5:
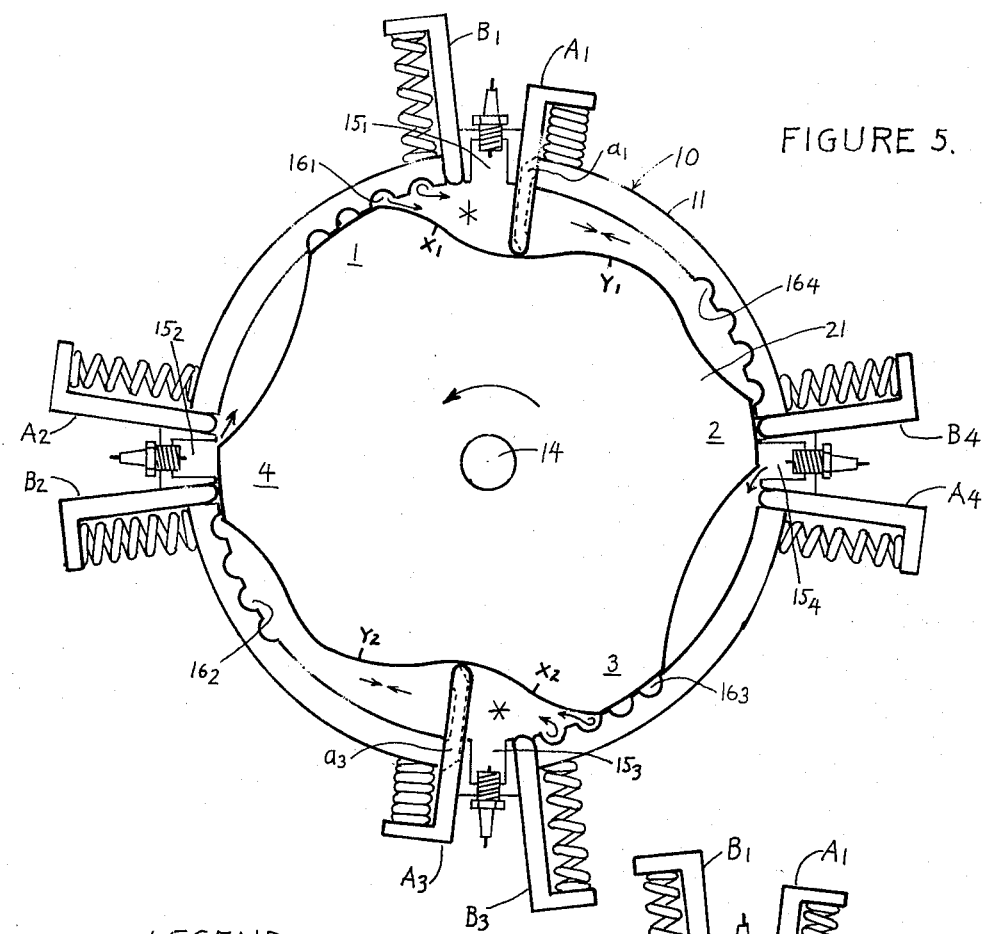

It will be observed, by initial reference to FIG. 5, that the outlet port $a_1$ of gate $A_1$ closes after the rotor 21 has rotated only a short distance. Thus, as rotation of the rotor 21 begins, the gate $A_1$ rides along the curved face of the rotor 21 and extends until, on reaching point $x_1$, the outlet port $a_1$ of gate $A_1$ is blocked, or closed. In this manner, only a predetermined amount of the spent gas is released and the extreme pressure is reduced, after which time the main chamber between gate $A_1$ and lobe 2 is closed, and much of the residual spent gas, at more elevated pressure, as the gas is compressed between the forward face of lobe 2 and gate $A_1$, is forced into the minor chambers $16_4$ and primary chamber $15_4$ by the passing lobe 2, and bypassed for subsequent recycle. It will be observed that the volume of the firing chamber between the trailing face of lobe 1 and gate $A_1$ has continued to increase, and as the lobe 1 passes minor chambers $16_1$, increments of fresh fuel and recycle fuel are fed into the firing chamber and further combusted to sustain firing (represented in this instance by an asterisk of intermediate size, depicting firing of less intensity than in FIG. 4). By such incremental feedings of fuel to the combustion gases, temperature is moderated and kept under control, and recylce gases are more completely burned to provide a cleaner engine. Also during this period temperature is controlled and kept from going too low by the contour of rotor 21 which causes a decrease in the rate of volume expansion. As lobe 2 continues its passage, gate $A_1$ which continues to follow the curvature of the curved face of rotor 21 is again opened as a point $y_1$ comes into contact with the bottom of gate $A_1$ for further release of spent gas (as shown by reference to FIG. 6). As lobe 1 moves away from gate $A_1$, compression of the gas previously taken into the chamber between lobes 1 and 4 and admixed with recycled spent gas as lobe 4 passed primary firing chamber $15_1$ and minor chambers $16_1$ is now about to be initiated, the gas being compressed between the forward face of lobe 1 and gate $B_2$ which is about to extend by riding down the trailing face of lobe 4. The same sequence of operations which occurs within the main chamber between lobes 1 and 2 also occurs within the main chamber located between lobes 3 and 4. Thus, gate $A_3$ rides along the curved face of rotor 21 and extends until some initial spent gas is released, and on reaching point $x_2$, port $a_3$ of gate $A_3$ is closed. The rotation of the rotor 21 continues, and as point $y_2$ reaches the bottom of gate $A_3$, outlet port $a_3$ is again opened and gas again released.

Figure 6:
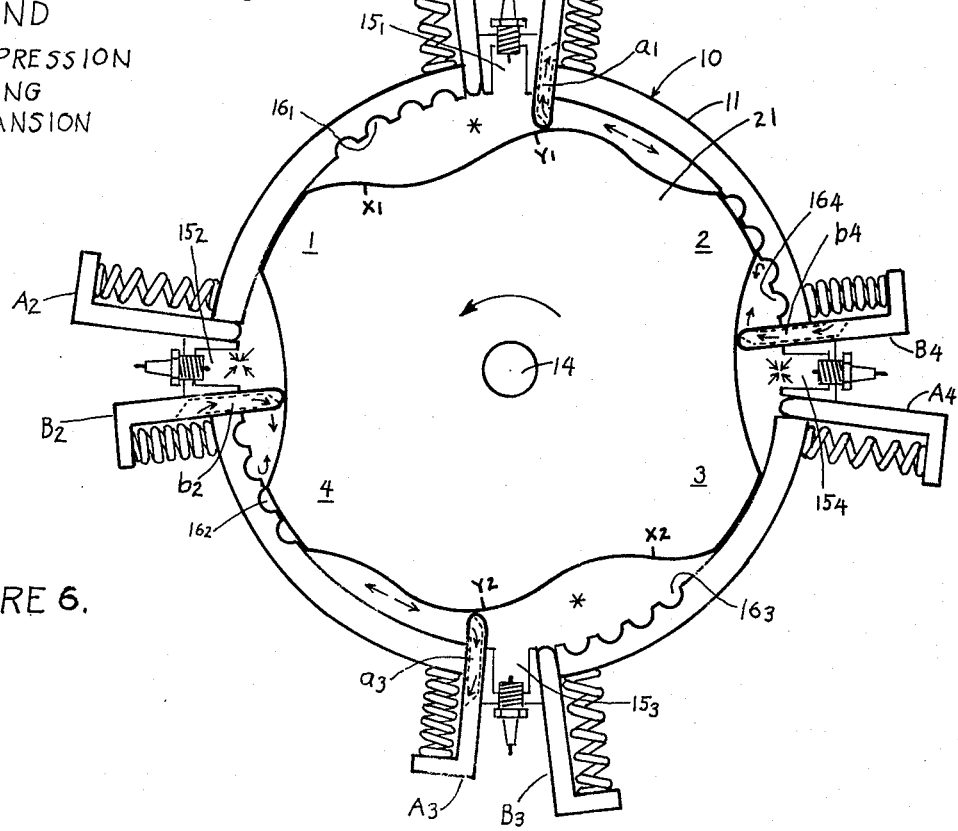

Continuing to refer to FIG. 5, but particularly by comparison of FIGS. 5 and 6, it will be observed that as lobes 1 and 3 continue their movement, increments of fuel from minor chambers $16_1$, $16_3$, previously by-passed by lobes 1 and 3, respectively, are fed in seriatim into the burning expanding gases located between gate $A_1$ and the trailing side of lobe 1 and between gate $A_3$ and the trailing side of lobe 3, respectively, after which time the combustion begins to subside (small asterisk, little residual burning).

Continuing the reference to FIG. 6, compression of the gases within the chambers between lobe 1 and gate $B_2$, and between lobe 3 and gate $B_4$ is taking place, and exhaust of spent gases from the chambers between lobe 4 and gate $A_3$, and between lobe 2 and gate $A_1$, is continued. As lobe 4 progresses its movement also, the gate $B_2$ is extended, the inlet port $b_2$ thereof is opened and combustible fuel is fed into the chamber behind the trailing edge of lobe 4 and admixed with spent fuel recycled as lobe 4 moved past the primary chamber $15_2$ and the minor chambers $16_2$. Simultaneously, as lobe 2 progresses counterclockwise, gate $B_4$ is extended behind the trailing edge of said lobe 2 and fresh gas is fed via inlet port $b_4$ into the chamber between gate $B_4$ and behind the trailing edge of lobe 2, also admixing with spent fuel bypassed as lobe 2 moved past primary chamber $15_4$ and minor chambers $16_4$.

With further reference to FIG. 6, as the rotor 21 continues its movement, gas is compressed within the firing chambers $15_2$, $15_4$ between lobe 1 and gate $B_2$ and between lobe 3 and gate $B_4$, respectively; the intake of fuel within the chambers between gate $B_2$, via inlet port $b_2$ and lobe 4 and between gate $B_4$ via inlet port $b_4$ and lobe 2 is continued; spent gas is exhausted from the chambers between the forward face of lobe 2 and gate $A_1$, via the outlet port $a_1$, and between the forward edge of lobe 4 and gate $A_3$, via the outlet port $a_3$; and the burning of fuel between gate $A_1$ and the trailing face of lobe 1 and between gate $A_3$ and the trailing face of lobe 3 is continued, but near abatement. As the lower terminal ends of gates $A_1$ and $A_3$ ride over the elevated portions of the rotor surfaces beyond $y_1$ and $y_2$, respectively, the effective force recipient area at the trailing face of lobe 1 and lobe 3, respectively, is again increased by the change in rotor contour to maximize the thrust of the gases against the rotor. If desired, at this point in time, an inert gas, e.g., steam, can be injected to utilize the heat content of the residual burning charge of fuel and thereby increase the total expansion of the gas (as via injection means not shown). The arc length of this portion of the rotor 21 contour is extended to derive full utilization of the pressure forces available and to lower the final temperature of the exhaust gases.

It is apparent from the foregoing, to briefly summarize, that the engine 10 is symmetrical for each 180°. It is a multiplicity of two as relates to the combination of essential components for this embodiment. In a multiplicity of three, the engine 10 would be symmetrical for each 120°; for a multiplicity of four, each 90°, etc. One pair of oppositely disposed lobes (i.e., the "odd" numbered lobes 1 and 3) constitute firing and compression lobes, while the other pair of lobes (i.e., the "even" numbered lobes 2 and 4) constitute fuel intake and gas exhaust lobes. On one side of lobes 1 and 3 firing is occurring, and on the other side compression is occurring. On one side of lobes 2 and 4, fuel intake is occurring, and on the other the exhaust of spent gases is taking place. A compression stroke by each of "firing and compression" lobes 1 and 3 takes place on each quarter rotation of the rotor 21, the gas being compressed between the leading face of lobes 1 and 3 and a gate B cooperating therewith, and near the end of the compression stroke, the compressed gas is forced into the primary firing chambers after which time firing occurs such that the gases expand between the trailing faces of lobes 1 and 3 and a gate A. An intake stroke for each of "fuel intake and gas exhaust" lobes 2 and 4 occurs on each quarter rotation, and during the same period with the firing and compression strokes, on each quarter rotation of the rotor 21, fresh fuel is drawn into a chamber between the side of a gate B and the trailing side of a lobe 2 and 4, while also during the same period spent gases are ejected on compression between the leading side of lobes 2 and 4 and a gate A. A compression thus occurs each time a "firing and compression" lobe 1 and 3 approaches a gate pair AB, and a firing occurs at each subsequent time that a "firing and compression" lobe 1 and 3 forces the compressed fuel into the primary firing chamber, which occurs as a firing and compression lobe moves through a gate pair AB. Similarly, an intake occurs as "fuel intake and gas exhaust" lobes 2 and 4 pass beyond a gate B and recede therefrom, a gate B serving as a chamber partition during compression and intake, and an exhaust occurs as "fuel intake and gas exhaust" lobes 2 and 4 approach a gate A, which serves as a chamber partition during exhaust and firing. In other words, two compressions, two firings, two fuel intakes and two spent gas exhausts occur for each quarter turn of rotor 21; or, stated another way, eight compressions, eight firings, eight fuel intakes and eight spent gas exhausts occur during each complete 360° rotation of rotor 21. In any engine of this invention, inclusive of embodiments to be subsequently described, the number of firings per complete cycle of rotation of rotor 21 (and consequently the number of compressions, intakes and exhausts) is equal to the number of lobes located on the rotor times the number of gate pairs, divided by two. Eight firings thus occur for each cycle of rotation of the embodiment described by reference to FIGS. 2 through 6.

A more preferred form of the invention is characterized by the engine 50 depicted in partially schematic fashion by reference to FIGS. 7 through 10. The engine 50 includes structure which permits the intake and utilization of multiple feeds, the admixing of such feeds, and the positive injection or "pumping" of feeds, or admixtures of feeds, and various components or admixtures of various components and feeds from one section to another of the engine.

The engine 50 comprises generally the combination of a stator 51 and rotor 61 rotatably mounted on an axle 54. The stator 51 is provided with three principle or primary firing and compression chambers $55_1$, $55_2$, $55_3$, inclusive of spark plugs and ignition means (not shown), and each is provided with an associated firing and compression gate pair, $A_1B_1$, $A_2B_2$ and $A_3B_3$, respectively. The AB gate pairs, as in preceding FIGS. 1 through 6, are spring biased although, for purposes of clarity, the springs (except as relates to gate pair $A_1B_1$ of FIG. 7) are not shown. In this embodiment, rotor 61 includes only two areas of contact with the inside wall of stator 51, viz., lobes 1 and 2; and hence it includes two main chambers within the annulus between the inside wall of stator 51 and the contoured external surface of the rotor 61. A firing and exhaust chamber is formed between lobes 1 and 2 on the side of the rotor 61 which encompasses points $x$, $y$, $w$ and $z$, and an intake and compression chamber, which encompasses point $u$, is formed on the opposite side of rotor 61 between lobes 1 and 2. Whereas the rotor 61 of engine 50 includes only two lobes, rather than four as embodied in engine 10, and only three AB gate pairs and primary firing chambers rather than four as embodied in engine 10, the structure, function, and principle of operation of this specific combination of members is no different than the corresponding members embodied by engine 10.

The engine 50, however, does include features not embodied in engine 10. The engine 50 thus includes additionally special purpose gates $C_1$, $D_1$, $E_1$ and $F_1$, $C_2$, $D_2$, $E_2$ and $F_2$, and $C_3$, $D_3$, $E_3$ and $F_3$, respectively. It is thus observed that a complete set of gates C, D, E and F are located between each AB gate pair, i.e., $C_1$, $D_1$, $E_1$ and $F_1$ are located between gate pairs $A_1$, $B_1$ and $A_2$, $B_2$, gates $C_2$, $D_2$, $E_2$ and $F_2$ are located between gate pairs $A_2 B_2$ and $A_3B_3$ and gates $C_3$, $D_3$, $E_3$ and $F_3$ are located between gate pairs $A_3B_3$ and $A_1B_1$. The function of each of the several sets of C, D, E and F gates are identical one set with another. The stator 51 of engine 50, like engine 10 described by reference to FIGS. 2 through 6, is also provided with sets of minor chambers 55 on the inside wall of the stator 51 which, unlike that embodiment, are provided with spring loaded entry covers which open in response to pressure to take in gaseous admixtures (i.e., fuel components and various other additives) or close, in view of a lack of pressure, to exclude such mixtures, as subsequently described. It is also provided with means for the input of various fuels and components, and means for the output and transfer of various admixtures of fuels and components, the input and output means generally comprising inlets and outlets located within the various gates.

The rotor 61 in this embodiment is provided with a specially contoured surface or face which facilitates the admixing and pumping of various fuel components from one part of the engine to another. It is, as suggested, provided with two lobes, a firing and compression lobe 1 and an intake and exhaust lobe 2. The odd numbered lobe 1, as in the previous embodiment, is always associated with compression and firing functions, said firing being initiated as said lobe 1 passes through an AB gate pair. Lobe 2, on the other hand, as in the previous embodiment, is always associated with the intake and exhaust functions. Gases, on the one hand, are exhausted from a chamber on the approach of lobe 2 toward an A gate, the gases being positively forced from a chamber by the approaching lobe 2 via an outlet. On the other hand, intake always occurs at the trailing face of lobe 2, a suction being created between said trailing face of the retreating lobe 2 and a gate which has been extended behind said lobe 2. The C, D, E, F gates operate within the intake and compression main chamber between the AB gate pairs, and in conjunction with the action of rotor 61 and intake and output means provide partitions, in addition to and in concert with gates A, B, for the intake, injection, admixture, compression and exhaust of various fuels, components, spent gases and admixtures of these, as well as for the transfer of gaseous components and admixtures from one part of the engine to another via transfer manifolds.

Referring initially to FIG. 7, it will be observed that, on counterclockwise rotation of rotor 61, lobe 1 has just passed through gate pair $A_1B_1$, gate $A_1$ having extended into contact with rotor 61 and into the firing and exhaust chamber, gate $A_1$ having followed the curvature at the trailing face of lobe 1, and gate $B_1$ has just been raised from its previously extended position. the combustible mixture of gases compressed within the primary firing chamber $55_1$ by lobe 1 acting in concert with previously extended gate $B_1$ is ignited, and the burning gases are expanding against a face of gate $A_1$, affixed to the stator 51, and the trailing face of lobe 1 thereby imparting a thrust against rotor 61 to produce the counterclockwise rotation of the latter. The burning of the gases at this stage of ignition is quite vigorous (as indicated by the large asterisk) and hence to counteract the rapid rise in temperature the volume of the firing chamber is caused to expand quite rapidly as gate $A_1$ continues to extend further inward on continued rotation of rotor 61. At this point in time, exhaust gases from the chamber between gate $A_1$ and the forward face of lobe 2 are permitted to escape or exhaust through a port which opens in gate $A_1$ (indicated by an arrow through the gate to "EXH," which indicates exhaust). This escape of exhaust gases, which began as gate $A_1$ began to extend and ride down the back slope of lobe 1, is continued until the bottom of gate $A_1$ reaches and contacts point $x$ on rotor 61. At point $x$ this "EXH" channel is closed, or blocked, and a second exhaust channel is then opened in gate $A_1$ whereby exhaust gases are diverted into a transfer manifold (represented schematically as circle E), the driving force resulting from a slight expansion of the gases.

Referring initially to FIG. 8, it will be observed that as the rotation of rotor 61 progresses, increments of a combustible mixture are fed from minor chambers $56_1$ into the burning mixture of gases in the firing chamber to sustain the firing. The rapid expansion of the firing chamber, and the controlled fuel addition sustain the burn and moderate the temperature of burning. While the firing progresses, exhaust of the gases from the chamber on the opposite side of gate $A_1$ (which effectively separates the firing and exhaust chambers) to the transfer manifold is continued. The exhaust gases by this time are no longer undergoing expansion, and are positively expelled, or "pumped" to the exhaust transfer manifold $E$ as the volume of the exhaust chamber is decreased by the encroachment of lobe 2 into the exhaust chamber which decreases the total volume.

As lobe 1 passes gate $F_2$, gate $F_2$ rides down the trailing face of said lobe and is extended and the introduction of a first fuel component from a nonpressurized manifold (indicated by a numeral 1 within a square) is initiated via a channel in gate $F_2$ (indicated schematically by an arrow). Gate $A_3$ remains in retracted position, and gate $B_3$ is about to begin its extension down the trailing face of lobe 2.

Figure 9:
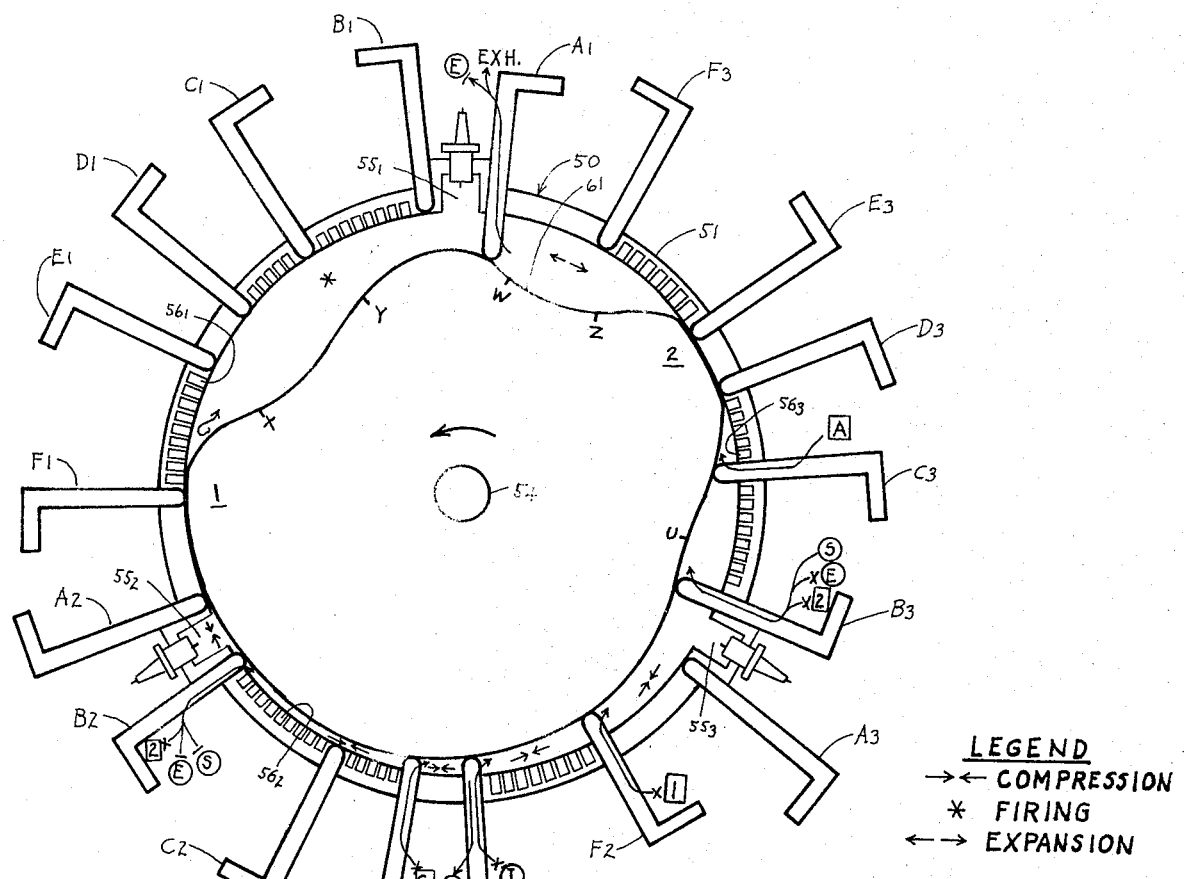

A feature of the minor chambers 56 of this embodiment vis-a-vis those previously described with reference to engine 10 is that each individual chamber of a set is provided with a pressure responsive cover which opens and remains open under high pressure to permit ingress or egress of fuel admixtures from or into the main chambers, and closes and remains closed under low pressure to prevent bypassing of spent gases from the firing chamber into the compression chamber as lobe 2 passes. If desired, the primary firing chamber 55 can be operated in similar manner, i.e., provided with spring loaded pressure responsive covers. The individual minor chambers 16 of engine 10, on the other hand, are permanently open. The advantage of minor chambers 56 which open and close in response to pressure is that the individual chambers 56 are opened and filled with admixtures of fuel when opposite an input chamber, and remain open to provide increments of fuel to sustain the combustion of a fuel mixture when opposite a firing chamber, e.g., as is occurring in FIGS. 7 and 8, respectively, with reference to the set of minor chambers $56_1$, whereas the set of minor chambers $56_3$ in FIGS. 8 and 9 are closed against the low pressure and spent gases are prevented from entering. A minor chamber $56_{1A}$ of a set is thus shown in FIG. 7A, as a cut-away fragmentary view. The chamber $56_{1A}$, shown in open position, thus includes a cylindrical opening of limited depth $56_{1B}$ within which is reciprocally mounted a cylindrical piston $56_{1C}$, the latter member being spring biased within said cylindrical opening via a helical spring $56_{1D}$ seated within the cylindrical opening $56_{1B}$ between piston $56_{1C}$ and the enclosed end of said chamber located within the stator wall. The piston $56_{1C}$ is provided with a seal $56_{1E}$ to prevent escape of gas, and the enclosed end of the cylindrical opening $56_{1B}$ is provided with a pressure equalization port $56_{1F}$. A retaining ring $56_{1G}$ limits the forward extent of travel of piston $56_{1C}$, as occurs when said chamber $56_{1A}$ is in closed position. The minor chambers 56 are arranged in parallel rows in this embodiment, their number and the depth of their openings (e.g., $56_{1B}$) determining their aggregate volumes between adjacent gates, this affording varied preferred degrees of compression for the several components. For example, the inert component compression between gates E, F is much less than for the components between gates B, D.

With initial reference to FIG. 9, it will be observed that rotor 61 has progressed sufficiently far in its counterclockwise rotation that the gate $A_1$ has passed beyond point y, at which point gate $A_1$ has retracted sufficiently such that the channel in gate $A_1$ to the exhaust transfer manifold (pressurized represented by E inside a circle) has now been closed, and the second channel in gate $A_1$ has again been opened to exhaust, "EXH." This action continues as the rotor 61 progresses its counterclockwise motion, and gate $A_1$ begins to extend further following the contour between points y and w. Compression begins again within the main chamber between the leading face of lobe 2 and gate $A_1$ as gate $A_1$ passes point w. Spent gases are again diverted to the exhaust transfer manifold (E within a circle), and final expansion begins as gate $A_1$ passes point z, the remaining spent gases being diverted once more to the exhaust manifold "EXH" for exit from the engine. The firing within the firing chamber is essentially completed (represented by very small asterisk). As lobe 2 passes gate $B_3$, a channel within gate $B_3$ opens and fuel No. 2 from a nonpressurized manifold is drawn into the increasing volume between the trailing face of lobe 2 and gate $B_3$. As gate $B_3$ extends further down the back slope of lobe 2, a second intake channel is opened and spent gases are introduced into the chamber from the pressurized exhaust transfer manifold. Check valves provided within the supply lines prevent back flow of the fuel mixture or the spent gases, the latter of which is provided under pressure. As the rotor 61 progresses further in its rotation, a special component S is introduced from a second transfer manifold. (These several sequences of events are represented in the drawing by a numeral 2 shown inside a square in combination with a check valve x, and E inside a circle with a check valve x, and an S inside a circle, respectively. As gate $B_3$ extended down the trailing slope of lobe 2, the various openings within the gate $B_3$ unblocked in the order of manifold pressures, i.e., fuel No. 2 is unpressurized, exhaust gas is slightly pressurized and special component S is at a higher pressure. Compression has started between gates $F_2$ and $B_3$ and the flow of the fuel into the chamber ceases.

As lobe 2 continues its counterclockwise movement, as shown by continued reference to FIG. 9, the intake chamber is further widened until such time that gate $C_3$ rides down the trailface of lobe 2, a new chamber opening up between the trailing face of lobe 2 and gate $C_3$. As this occurs, a pressure drop is produced between the trailing face of lobe 2 and gate $C_3$ and a new component, e.g., air (represented by an A inside a square), is introduced via an inlet (represented by arrow) into the expanding chamber. A check valve is contained within the inlet to prevent back flow. Some moments after the intake of air is initiated, gate $C_3$ reaches point u, the low point on the rotor contour, at which point the flow of the last of the components introduced through gate $B_3$ stops (the intake openings in gate $B_3$ will be serially blocked as the gate is gradually lifted) and compression of the gases between gates $B_3$ and $C_3$ is begun.. Back flow of the gases through the inlets is prevented by the check valves installed within the inlet lines (represented by x's shown in the lines).

Figure 10:
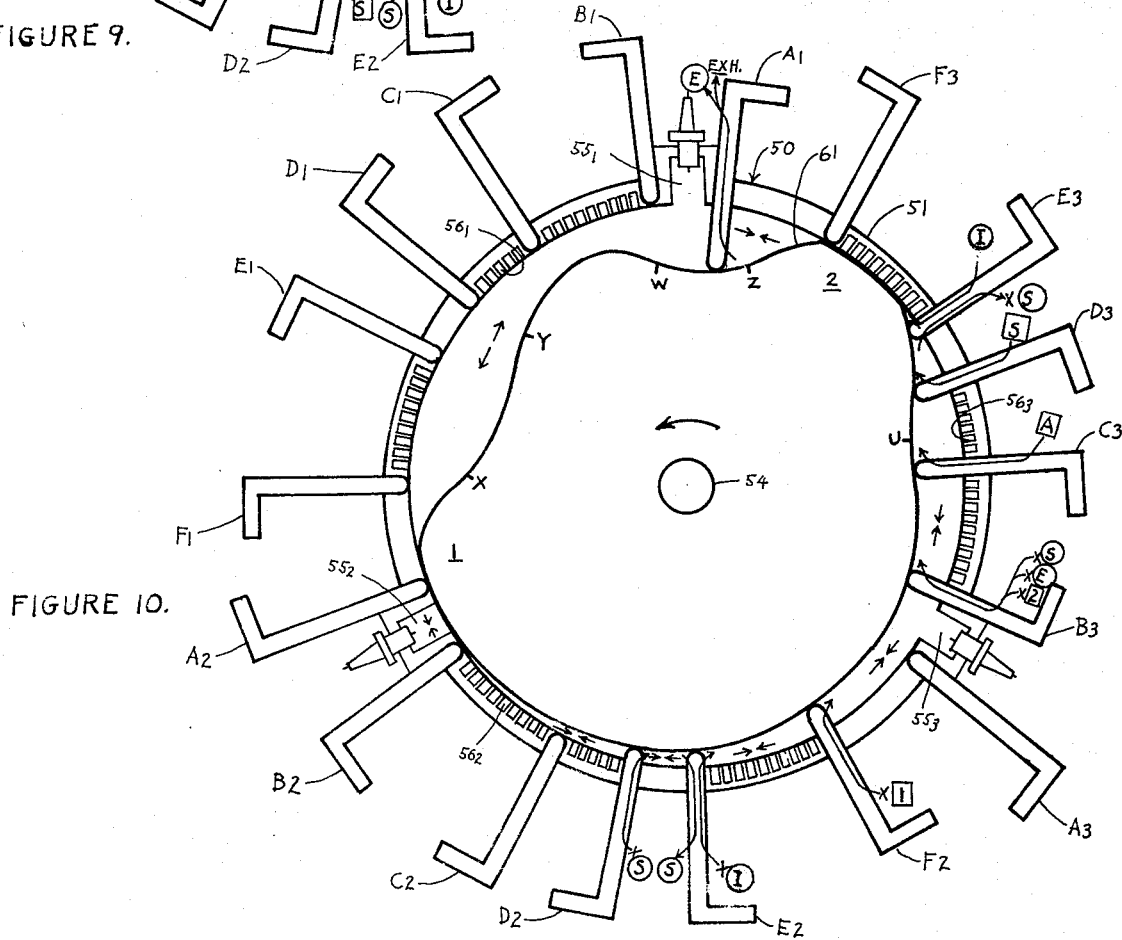

Referring to FIG. 10, as lobe 2 continues its counterclockwise progress, Gate $D_3$, and then gate $E_3$, next begin to extend, the gates riding down the trailing face of lobe 2. Gate $D_3$ allows intake of a fuel component S from a nonpressurized source as it extends, and intake is continued until gate $E_3$ reaches the low point u on the rotor contour. At this point in time, a slight pressure begins within the intake chamber between gates $D_3$ and $E_3$, back flow being prevented by a check valve within the intake line, and upon the approach of lobe 1 special component S is forced or "pumped" into a pressurized manifold (S within a circle) through a channel in Gate $E_3$ open toward the approaching lobe 1. As $E_3$ is extended into the input chamber, an inert component I is fed, under pressure. Upon the extension of $F_3$ into the input chamber, a fuel component 1 from a nonpressurized source is fed into the chamber. The injection of inert component I into the chamber via a channel within gate $E_3$ is continued until the lower portion of gate $F_3$ contacts point u on the rotor surface. At this point in time, as lobe 1 continues to approach, compression is proceeding between gates $B_3$ and $C_3$ and is about to proceed between gates $C_3$ and $D_3$, whereupon gate $C_3$ shall be retracted to allow last moment mixing of all components contained between gates $B_3$ and $D_3$, as is shown with reference to gate $C_2$ in FIGS. 8 and 9. Gate $A_1$ is retracted by the approach of the leading face of lobe 2 and remains retracted on the passage of lobe 2, A gates never being extended into the input and compression chamber. On the passage of lobe 2, gate $B_1$ is extended down the trailing face of lobe 2, the gases contained between gates $F_3$ and $B_1$ being compressed.

In general, therefore, it will be observed that as lobe 2 passes any of gates B, C, D, E and F, each is extended, in seriatim, and various components are introduced into the chamber. The introduction of a component, or components, into a chamber via a gate member is continued in each case until the next gate of the sequence has reached point $u$, the low point on the rotor, at which point in time the introduction of a component, or components, is discontinued. In each instance, compression is produced between adjacent pairs of gates of the series as lobe 1 approaches, which in the instance of adjacent gates BC, CD (and subsequently BD) and EF, produces an opening of the minor chambers 56 so that the fuel components are stored therein, by-passed by approaching lobe 1, and maintained within the minor chambers 56 until introduced into the main firing chamber on the passage of lobe 1 past the minor chambers 56, and which in the instance of adjacent gates DE causes special component S to be "pumped" through a channel within gate E into a pressurized transfer manifold (S within a circle), and further in the instance of adjacent gates FB the fuel is forced into a primary firing chamber 55.

The functions performed by gates $F_2$ and $A_3B_3$ on the approach of lobe 1 are identical to those performed by gates $F_1$ and $A_2B_2$, and hence the functions performed by the latter on the approach of lobe 1 are thus identical, reference again being initially made to FIG. 8. Thus, it will be observed that gate $B_2$ has now descended and that a fuel No. 1 is now introduced via an inlet of gate $F_1$ into the chamber between gates $F_1$ and $B_2$. On the approach of lobe 1, which is completing the final stage of compression of the inert gas between gates $E_1$ and $F_1$, compression occurs, and on the continued approach of lobe 1 gates $E_1$ and $F_1$ (FIG. 9) are raised, and the inert gas, e.g., air initially, changing to low pressure steam produced from exhaust gas heat as engine 51 continues to run, is fed into the firing chamber at the end of the firing sequence, providing maximum utilization of the heat content of the fuel to obtain maximum thrust of the rotor 61, the contour of which at this point provides for an increased area of force recipient through an elongated portion of the main firing chamber. Gases are compressed within the primary firing chamber $55_2$. As lobe 1 passes gate $A_2$, the latter rides down the trailing face of lobe 1 and the gases within primary firing chamber $55_2$ are fired. The precise positioning of lobe 1, as this occurs, is identical to that which is shown in FIG. 7, except that in the latter figure the gates referred to are gates $A_1B_1$ and the chamber being fired is primary chamber $55_1$. The sequences described are repeated ad infinitum in operation of engine 50.

Further refinements in the internal combustion rotary engine of the present invention are also quite feasible, one embodiment in particular involving "multiple firing." Multiple firing involves the burning of a combustible mixture, or fuel charge, recovering all of the spent exhaust gases (as opposed to recycle of a portion of these gases), recombining or admixing a fresh fuel, or plurality of different fuels, with the spent gases and repetitively burning these gases in the engine. In multiple firing, greater efficiency is obtained from the fuel in that a greater quantity of the fuel is combined with oxygen and burned, this providing a more complete overall reaction in performing useful work, and the products of the combustion are "cleaner" in that more of the fuel is burned to carbon dioxide and water.

A preferred embodiment of a multiple firing engine 70 is shown by specific reference to FIGS. 11 through 14. As in previous embodiments, the rotary engine 70 includes the combination of a generally cylindrical casing or stator 71 and certain other elements, previously defined as by reference to FIG. 1, and hence these need not be further illustrated, this including stationary stator end walls, bearing boxes within which the shaft 74 is journalled, flanges which enclose the ends of the lobed rotor 81 rotatably mounted on said shaft 74, and seals which provide a gas tight fit between the said outer flange edges of rotor 81 and the circumference of the inner wall of stator 71, between which flanges the various gates, or abuttments hereinafter described, are located.

The embodiment characterized by reference to FIGS. 11 through 14 include generally, as suggested, a stator 71 and lobed rotor 81, journalled upon and rotatable in counterclockwise direction about axle 74. The inside wall of stator 71, like that of engine 50 previously described, is provided with sets of minor chambers $76_1$, $76_2$, $76_3$, $76_4$ of relatively small dimension which are mechanically operated so that the individual chambers can be opened and filled with fuel, or admixtures of fuel, from an input chamber, or opened to provide increments of fuel for sustaining combustion or to effect more complete burning of the fuel within firing chamber S, or to aid in more thorough mixing of fuel prior to firing in main chamber S. In this particular embodiment, as in previous embodiments, the rotor 81 is provided with seal lobes, irregularly spaced apart one from another. They are six in number, and numbered for convenience 1 through 6 in the drawings. Unlike previous embodiments, it will be observed that odd numbered lobes 1, 3, and 5 are provided with sliding extensible contact seals 01, 03, 05 which follow the contour of the inner wall of the stator 71. The odd numbered lobes, as in previous embodiments, are firing lobes, viz., lobes 1, 3 and 5. Gate pairs AB, four in number--viz., $A_1B_1$, $A_2B_2$, $A_3B_3$ and $A_4B_4$--are spaced, as in previous designs, at even intervals. As in previous designs, firing takes place as odd numbered lobes, i.e., lobes 1, 3 and 5, pass through each AB gate pair, i.e., $A_1B_1$, $A_2B_2$, $A_3B_3$ and $A_4B_4$. The AB gates, also as in previous designs, are located one of a pair on each side of a primary firing chamber $75_1$, $75_2$, $75_3$ and $75_4$. The spark plug mounted within each of chambers 75 is not shown, nor is the ignition system associated therewith shown. The stator 71 is of circular or cylindrical cross-section, deviating from a circle at bulged sectors K, L, M and N. It is provided with gates $C_1$, $D_1$, $E_1$ and $F_1$ located between gate pairs $A_1B_1$ and $A_2B_2$; gates $C_2$, $D_2$, $E_2$ and $F_2$ located between gate pairs $A_2B_2$ and $A_3B_3$; gates $C_3$, $D_3$, $E_3$ and $F_3$ located between gate pairs $A_3B_3$ and $A_4B_4$; and gates $C_4$, $D_4$, $E_4$ and $F_4$ located between gate pairs $A_4B_4$ and $A_1B_1$. As in previous designs, the main chambers are defined within the annulus between the external surface of the rotor 81 and inside wall of the stator 71.

The several main chambers, each formed between adjacent lobes within the annular space between the external surface of the circumferential wall of rotor 81 and inside wall 71 of the stator, six in number, are of different volumes and, for convenience, are designated by the letters O, P, Q, R, S and T. Each time lobe 1 passes an AB gate pair, the first firing of a series of three firings occurs in main chamber O, located between lobes 1 and 2, firing a mixture of recycled exhaust from firing chamber S, located between lobes 5 and 6, and a fuel component 1 is taken in through a channel in a gate E. Each time lobe 3 passes an AB gate pair the second of a series of three firings occurs in main chamber Q, located between lobes 3 and 4, firing a fuel component 2 taken in through a channel in a gate D, and all of the exhaust from the chamber O firing. Each time lobe 5 passes an AB gate pair the third of a series of three firings occurs in chamber S, firing a mixture of fuel component 3 taken in through a channel in a gate C, and exhaust from chamber Q.

In each stage, beginning with the intake of fuel from the first manifold, i.e., as lobe 6 moves past extending gate E, the increments of fresh fuel taken into the engine are preferably increased as the rotor revolves from one station to the next because of the increase in the volume of the fuel due to accumulation of burned gas carried through the engine. It will be observed that firing chambers O, Q and S become progressively larger, and all of the firing chambers are shaped to permit initial rapid expansion of a burning fuel, with subsequent decrease in the volume rate of expansion as temperature is moderated and brought under control at a temperature below that favoring the production of nitrous oxides, with subsequent increase in the area of force recipient through an elongated section to improve energy utilization, deriving said shape in part in combination with the stator bulges K, L, M and N.

The plurality of chambers located between adjacent pairs of firing lobes, i.e., chambers O and P located between lobes 1 and 3, chambers Q and R located between lobes 3 and 5, and chambers S and T located between lobes 1 and 5, are always separated one group from the other by virtue of the extensible contact seals 01, 03 and 05, respectively, being thrust into the bulged sections K, L, M and N on passage. On the other hand, whereas adjacent chambers OP, QR and ST are separated by sealed contact of lobes 3, 4 and 6 with the inner circular cross-section of the wall of stator 71, these adjacent pairs of chambers are connected as lobes 2, 4 and 6 pass through bulged sections K, L, M and N.

This embodiment will be best understood by specific reference to the sequence of views depicted by FIGS. 11 through 14, respectively, by virtue of which a complete sequence of operation can be conveniently described. In the description, emphasis is centered upon the manner in which burned gases are handled.

Referring initially to FIG. 11, it will be observed that chamber S between gate $A_4$ and lobe 6, is filled with burned gases from previous firings, which are being exhausted through a channel (indicated by an arrow) in gate $A_4$. The exhaust of burned gases from chamber S is continuing except that, as will be observed, a residual of the burned gases is being left behind in bulge M of stator 81 as lobe 6 sweeps through this area without contacting the inside wall of the stator 81. A firing, the third of a previous series, is in progress, and gases are expanding within chamber S between the opposite face of gate $A_4$ and extensible seal 05 of lobe 5. Compression of gases is occurring in chamber R between extensible seal 05 of lobe 5 and lobe 4. Compression is in progress within bulge K, or within the area located between lobe 4 and gate $C_1$, between lobe 3 and gate $B_2$, and between extensible lobe 01 and gate $E_2$. As lobe 1 progresses, on rotation of the rotor 81, the extensible seal 01 forces burned gases in front of it, in the direction of sweep. Gate $E_2$, at this point of time, has extended down the trailing face of lobe 6 as it passed, and fuel is drawn in through a channel (represented by arrow) within gate $E_2$ from a first manifold (I). Gate $E_2$ thus separates burned gases and fresh fuel. Fuel is also being drawn into a channel (represented by arrow) in gate $C_1$ from a third manifold (III), and subsequently as shown by reference to FIG. 14, fresh fuel will also be drawn through gate $D_2$ from a second manifold (II).

With continued reference to FIG. 11, and by comparison of this figure with FIGS. 12 through 14, it will be observed that lobe 6, as suggested, in its progress sweeps through bulged area M leaving exhaust gases, or burned gases, therein, after which time the lobe 6 contacts the non-bulged segment of stator 81 and resealing takes place to effect partition of chambers S and T. Lobe 1, provided with extensible seal 01 which comes into contact with the inside wall of bulged M, forces the burned gas in front of it as it sweeps stator bulge M, building up a slight compression. The minor chambers $76_{3a}$, $76_{3b}$, at this point in time, are closed.

Referring initially to FIG. 12, the exhuast of spent or burned gas via a channel within gate $A_4$ continues as lobe 6 moves on past sector M, and the introduction of fuel from the first manifold (I) is discontinued as gate $E_2$ is lifted and the spent fuel previously contained between lobe 1 and gate $E_2$ is admixed with fresh fuel previously contained between gate $E_2$ and lobe 6. The introduction of fuel from the third manifold (III) between lobe 3 and gate $C_1$ is discontinued, and this volume of gas continues to expand. The firing between gate $B_2$ and lobe 1 has ended but expansion continues. The firing which was in progress between gate $A_4$ and lobe 5 is continued. Compression of gas is continued between lobes 4 and 5, i.e., within chamber R, lobe 4 and gate $C_1$, and lobe 3 and gate $B_2$. Compression of the mixture of gases is also continued between lobe 1 and gate $B_3$, the gases being compressed in part within partially open primary firing chamber $75_3$.

Referring to FIG. 13, as lobe 5 on slight further rotation of rotor 81 passes minor chambers $75_{4a}$, increments of fuel are fed from said minor recesses into the portion of chamber S at sector N between lobe 5 and gate $A_4$, and firing within the chamber is continued and sustained. Lobe 4 passes through bulged sector K, by-passing gases previously pushed into this sector and gate $B_1$ closes by riding down the trailing side of lobe 4 so that compression of the gas in chamber R between lobe 5 and gate $B_1$ is continued. Lobe 1 continues to compress the gaseous admixture of fresh and spent gases originally contained between lobe 1 and gate $E_2$. The introduction of fuel through gate $C_1$ is discontinued, as lobe 3 completes compression within firing chamber $75_2$ of the fuel formerly contained between lobe 3 and gate $B_2$.

Referring now to FIG. 14, as lobe 6 contacts the inside stator wall 71 near gate $C_3$, and continues on beyond gate $D_3$ and $E_3$, extensible seal 01 of lobe 1 is thrust outwardly and rides against the wall within bulged sector M, sealing chamber O off from chamber T. Firing within the chamber formed in bulged sector M between extensible seal 01 and lobe 2 now occurs, the gases which are being burned being a mixture of fresh fuel from the first manifold (I) and a portion of the exhaust gas from the previous firing as lobe 5 passed gate pair $A_3B_3$. The expanding gases exert a thrust against extensible seal 01 of lobe 1 to impart a counterclockwise thrust to the rotor. This is so, although the firing chamber in this particular instance is not sealed off by gate $A_3$, the area presented by the forward face of lobe 2 being small compared to the area of the trailing face of lobe 1 and extensible seal 01.

Lobe 2, at this point in time, has now passed through bulged sector L, and has now contacted and sealed (near gate $C_2$) against the inside stator wall 71. Fuel from a second manifold (II) is withdrawn through a channel of gate $D_2$ to fill the chamber between gate $D_2$ and the trailing face of lobe 2. The extensible seal 03 of lobe 3 has extended and swept the burned gas from sector L, and now a new firing is occurring within sector L. Compression is now in progress between the opposite face of extensible seal 03 of lobe 3 and extended gate $D_2$. On the resealing of lobe 2 against the inside stator wall 71, nearly all of the burned gases have been bypassed, except for a small amount of burned gas trapped within chamber O, which will be exposed to the firing behind lobe 1 as said lobe passes gate pair $A_3B_3$.

Behind lobe 2, gate $D_2$ is now extending, as previously suggested, by riding down the trailing face of said lobe, such that fresh fuel can be taken in from a second manifold (II). Gate $D_2$ is lifted when fuel intake is sufficient, and prior to the arrival of lobe 3 to allow new fuel from the second manifold (II) and burned gases from a previous firing to be admixed. As lobe 3 passes through gate pair $A_3B_3$, this mixture is fired.

The sequence of events relative to the third firing of a series of three firings as lobe 5 passes an AB gate pair can best be understood by a more generic description with reference to FIGS. 11 through 14 as required. Thus, the introduction of fuel III through a channel in a gate C (e.g., $C_1$ in FIG. 11) may continue (e.g., $C_1$ in FIG. 12) until on further rotation of rotor 81 the next gate F (e.g., $F_1$ in FIG. 13 with slight further rotation of rotor 81) rides down the back slope of lobe 3, but the gate C (e.g., $C_1$ in FIG. 13) may be retracted and the flow of fuel III cut off at any point, as with smaller fuel inputs through the gates D and E, whereupon fuel III will be allowed to begin mixing with spent gas from the second firing in the present series of firings which was previously contained between said gate C and lobe 4 (e.g., gate $C_1$ and lobe 4 in FIG. 11).

One portion of the poorly mixed fresh fuel from the third manifold III via a gate C and spent gases from the previous firing behind lobe 3 is bypassed as lobe 4 moves past a stator bulge and subsequently reseals against the stator 71 (e.g., bulge K and lobe 4 in FIGS. 13 and 14), while the other portion is compressed between a gate F (e.g., $F_1$ in FIG. 14) and lobe 4 and fed via open minor chambers $76_a$, $76_b$ (e.g., $76_{1a}$, $76_{1b}$ in FIG. 14) into the area between lobe 4 and a gate B (e.g., $B_1$ in FIG. 14). Quantities of gas are quite large and the "early" intake of fuel III into firing chamber Q with subsequent transfer to compression chamber R provides more time and agitation for a more thorough admixing of fresh fuel III with spent gases from two previous firings. The gate B (e.g., $B_1$ in FIG. 14) retracts upon approach of lobe 5.

As lobe 4 continues to pass the open minor chambers $76_a$, $76_b$ (e.g., $76_{4a}$, $76_{4b}$ in FIG. 11) mixing and transfer of fuel III and spent gases into compression chamber R continue. The gate B (e.g., $B_4$ in FIG. 11) has fully retracted on the passage of lobe 5 and the admixture is now contained between lobe 4 and extensible seal 05 of lobe 5 as said member 05 sweeps the inside surface of a stator bulge (e.g., N in FIG. 11). The third firing of the previous series of firings occurred in firing chamber S as lobe 5 passed an AB gate pair (e.g., $A_4B_4$ in FIG. 11) and is continuing between a gate A (e.g., $A_4$ in FIG. 11) and extensible seal 05 of lobe 5 as the seal 05 sweeps through the stator bulge (e.g., N in FIGS. 11 and 12).

As lobe 4 passes a primary firing chamber 75 (e.g., $75_1$ in FIG. 12) an additional admixture of fuel III and spent gas is fed into main chamber R via said primary chamber 75 which was filled with the admixture on approach of lobe 4. Primary firing chambers 75 are closed momentarily during the passage of lobes 2 and 6 by the same mechanical method used to open and close the minor chambers $76_a$ and $76_b$, the primary chambers 75 remaining open at all other times, their volumes being regulated to achieve the preferred compressions for the several fuel admixtures to be fired. Minor chambers $76a$ and $76b$ are opened after the passage of lobe 3 and remain open until chamber series $76_b$ closes after passage of lobe 4 and chamber series $76a$ closes after passage of lobe 5, said minor chambers 76 remaining closed at all other times.

Lobe 5 continues to approach an AB gate pair (e.g., $A_1B_1$ in FIG. 13), and the admixture of fuel III and spent gases is compressed within main chamber R between lobe 5 and a gate B (e.g., $B_1$ in FIG. 13) and firing continues between lobe 5 and a gate A (e.g., $A_4$ in FIG. 13). As lobe 5 passes the minor chambers 76 (e.g., $76_4$ in FIG. 13 with slight further rotation of rotor 81) a portion of the admixture of fuel III and spent gas is fed via said chambers $76_a$ into the firing that is proceeding at the trailing face of lobe 5, and thus some of the fuel admixture which will be ignited as the third firing in the present series is fed into the already burning third firing of a previous series.

With reference to FIG. 13, now thoroughly admixed fuel III and spent gases from the second firing in the present series is contained in chamber R between gate $B_1$ and lobe 5, and fuel III and spent gases from the second firing in the following series is contained between lobe 3 and gate $B_1$, and further, fuel III and spent gases from the second firing in the previous series is being burned in main chamber S between lobe 5 and gate $A_4$.

As lobe 5 continues its movement toward an AB gate pair (e.g., $A_1B_1$ in FIG. 14) the admixture of fuel III and spent gas is compressed into the primary firing chamber 75 located between the gates of said AB gate pair (e.g., $75_1$ in FIG. 14), and on passage of lobe 5 the gate A of said AB gate pair (e.g., $A_4$ in FIG. 11) is extended and the fuel admixture is ignited in main chamber S between lobe 5 and said gate A, constituting the third and final firing of the present series. As lobe 5 continues its movement past minor chambers 76 (e.g., $76_4$ in FIG. 13 on slight further rotation of rotor 81), increments of fuel III and spent gases from the following firing series are fed into chamber 5 to sustain the third firing of the present series.

The sequence of firings described by reference to FIGS. 11 through 14 is tabulated in Table I. The column headings list the

TABLE I

| | One Revolution | | | |
|---|---|---|---|---|
| | $A_1B_1$ | $A_2B_2$ | $A_3B_3$ | $A_4B_4$ |
| Lobe 1 | ① | ① | ① | ① |
| Lobe 3 | 2 | 2 | 2 | 2 |
| Lobe 5 | ③ | ? | 3 | 3 |

AB gate pairs equally spaced around the stator 71, i.e., $A_1B_1$, $A_2B_2$, $A_3B_3$, $A_4B_4$, and the left hand column is a list of the lobes located on the periphery of the rotor 81, i.e., lobes 1, 3 and 5. As shown in Table I and in FIG. 14, as lobe 1 passes gate pair $A_3B_3$ the first (1) of a series of three firings occurs (i.e., firings 1, 2 and 3 in which the spent gases from the first firing (1) are admixed with fresh fuel and refired in a second firing (2), the spent gases from which are also admixed with fresh fuel and fired for a third (3) and final firing).

With continued reference to Table I, as lobe 1 passes each AB gate pair in turn, a first firing (1) of a new firing series occurs, numbering four such firings per revolution of rotor 81. As lobe 3 passes gate pair $A_3B_3$, a second firing (2) of the previous series occurs, i.e., the series whose first firing (1) occurred as lobe 1 passed gate pair $A_2B_2$; and as lobe 3 passes each AB gate pair in turn, a second firing in a previous series occurs, again numbering four such firings per revolution of rotor 81. As lobe 5 passes gate pair $A_3B_3$, a third firing (3) of the second previous series occurs, i.e., the series whose first firing (1) occured as lobe 1 passed gate pair $A_1B_1$; and as lobe 5 passes each AB gate pair in turn a third and final firing in a previous series occurs, also numbering four such firings per revolution of rotor 81.

For purposes of clarity in Table I, the firings in the same series are depicted as being in the same envelope outline. Thus, it can be seen that there are a total of twelve firings for each 360° revolution of rotor 81, and that these firings involve all or part of six different firing series, only two of which are both initiated and completed within the span of any one revolution of the rotor 81.

In the sequence of operations described by reference to FIG. 11 through 14, certain observations can be made, to wit:

In a complete 360° rotation of rotor 81, twelve firings occur, viz., each time an odd numbered lobe, i.e., lobe 1, 3 and 5, passes through an AB gate pair, i.e., gate pairs $A_1B_1$, $A_2B_2$, $A_3B_3$ and $A_4B_4$.

The first increment of fresh fuel taken into the engine is burned in three separate sequential firings, the second increment is burned twice, and the third increment is burned once (except for the small portions of each that are recycled as lobe 6 bypasses spent fuel to be admixed with fuel No. 1 in a subsequent series) subsequent to which time most of the spent fuel is exhausted via gate $A_4$. A complete set of firings, i.e., 1, 2 and 3, occurs when all of lobes 1, 3 or 5, respectively, have passed through any one AB gate pair. Thus, a number 1 firing occurs behind lobe 1 as lobe 1 passes through gate pair $A_1B_1$, a number 2 firing occurs behind lobe 3 as lobe 3 passes through gate pair $A_1B_1$, and the last firing of a set, i.e., a number 3 firing occurs behind lobe 5 as lobe 5 passes through gate pair $A_1B_1$. The sets of firings, however, are spaced across three different series, as can be seen by reference to Table I. From this viewpoint, therefore, each complete rotation of rotor 81 produces four complete series of fuels burnings. It requires one and one-half revolutions of rotor 81 to initiate and complete four complete series of firings, as referenced by the envelopes described in Table I.

The use of extending sealing lobes, as employed in engine 70, permit rapid increase of distance between stator and rotor, this providing gradual slopes without requiring too drastic an increase in the slope which any extending gate must follow. Moreover, a greater distance between surfaces can be obtained without any necessity for any given gate to span that distance. In this embodiment, also, the stator bulges, or stator deviations from a circular cross-section, can constitute the desired firing volume, which can be shaped to obtain the desired rates of expansion of the combusting mixtures to control temperatures. This, inter alia, permits maximum flexibility for designing individual components, e.g., shorter and deeper rotor chambers and the like.

A preferred type of extensible seal is described in the fragmentary view depicted by reference to FIG. 11A, extensible seal 05 being representative of any of extensible seals 01, 03, 05 associated with firing lobes 1, 3 or 5. The extensible seal 05 is thus comprised of an extensible plate or gate 051 located within a channel 052, the rearward closed end of which is provided with compressible helical springs 053 against which the rearward end of extensible seal 051 is rested. The extensible seal 051 is slidable within the opening 052, and the forward end thereof abuts the inside wall of the stator 71 to form a seal, being forced outward by helical springs 053. The seal 051 is linked with a second plate 054 located within an adjacent, generally parallel channel 055 via a sprocket wheel or gear 056. The force exerted against the inside wall of stator 71 by the outer terminal end of seal 051 is proportional to the rpm (revolutions per minute) that the rotor 81 is rotated, but is controlled within reasonable limits by plate 054 which acts as a counterpoise. Thus, as the rpm of rotor 81 is increased, the outer end of seal 051 presses with greater force against the inside wall of stator 71, but the force is offset by the plate 054 which moves rearwardly in a direction opposite to that of seal 051. The effectiveness of the counterpoise is enhanced in that the latter plate 054 in its rearward movement abuts a series of weights 056, and the counter force acting against seal 051 as a result thereof is increased by the individual weights 056, incrementally effectively added by small rearward movements of plate 054. The weights 056 are lightly spring loaded to hold them seated at the ends of their several guide grooves even if the rotor 81 is stationary, such that the weights 056 can move inwardly when forced, but always move outwardly, each weight 056 to the limit of its individual guide groove length, when force is removed, this condition being depicted in FIG. 11A.

In the retracted position, as shown in FIG. 11A, seal 051 is exactly counterbalanced against centrifugal forces by the plate 054, and the forward end of seal 051 exerts a force against the wall of stator 71 only equal to the force of helical springs 053. When the extensible seal 051 is extended, as when the wall of stator 71 deviates from its generally circular shape, the travel radius of plate 054 is decreased and that of seal 051 is increased, causing the abuttment force against the inside wall of stator 71 to increase due to centrifugal force. However, at the moment each weight 056 in its turn is forced inwardly due to inward movement of plate 054, the seal 051 is again exactly counterbalanced by plate 054, having an effectively increased mass.

Figure 14A:
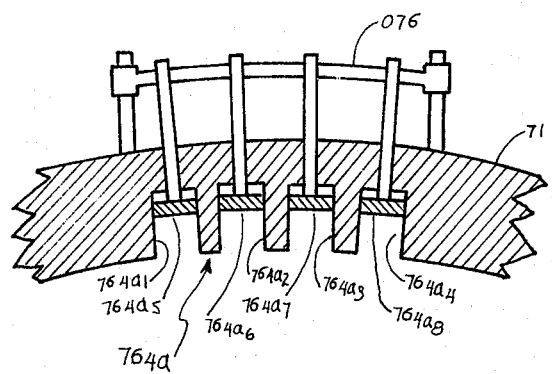

Minor recesses 76 of preferred type are depicted by reference to the fragmentary view of a set of minor recesses $76_{4a}$ depicted by reference to FIG. 14A. The set of minor recesses $76_{4a}$ are comprised of a plurality of small chambers $76_{4a_1}$, $76_{4a_2}$, $76_{4a_3}$, $76_{4a_4}$ located within the inside wall of stator 71, each being provided with a piston $76_{4a_5}$, $76_{4a_6}$, $76_{4a_7}$, $76_{4a_8}$ operated in banc via operative association with a cross bar 076 suitably actuated by mechanical means (not shown) in timed sequence.

Figure 15:
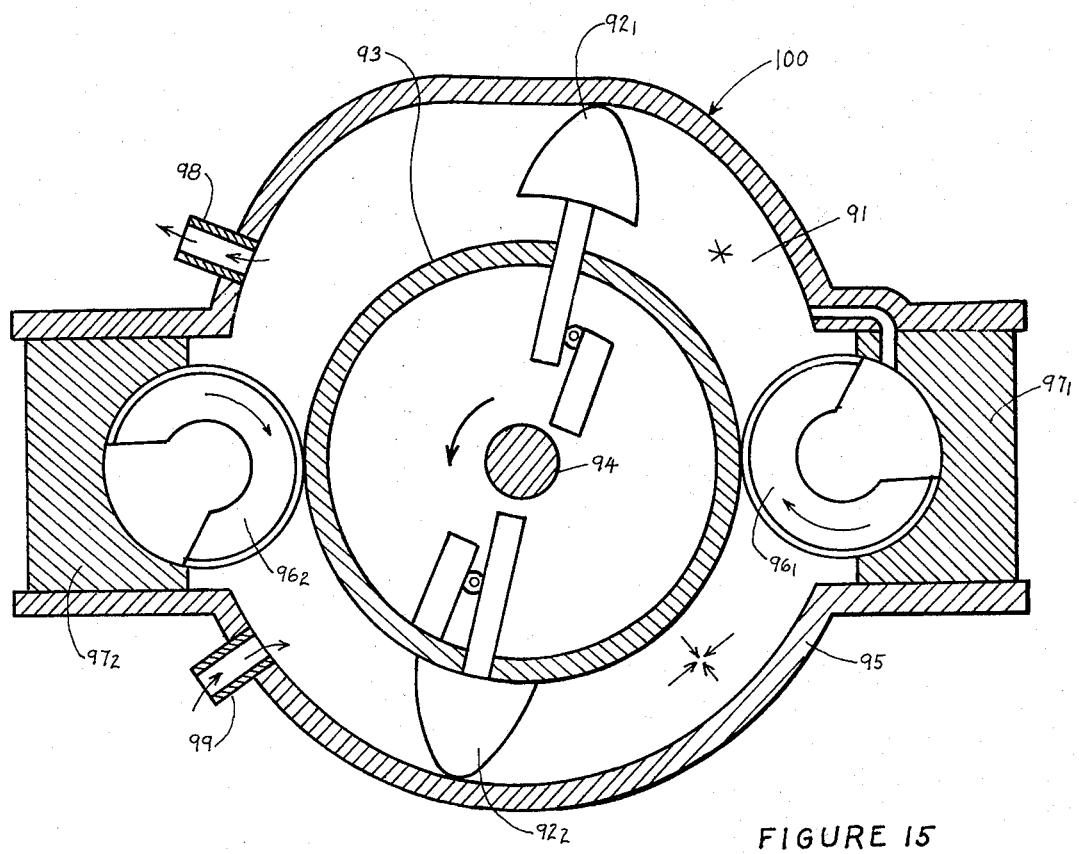
FIG. 15 depicts yet another preferred type of engine, certain of which features are embodied in the engine described by reference to FIGS. 11 through 14.

Referring to FIG. 15, there is shown another embodiment of the invention, viz., a simplified type of rotary internal combustion engine 100. This embodiment differs from one described by reference to U.S. Pat. No. 2,977,939 in two important respects, i.e., (1) the volume of the firing chamber 91 is shaped to provide an initial rapid expansion, and subsequently the volume rate of expansion is decreased to control the temperature of combustion, followed by a second increase in the volume rate of expansion enlarging the force area after firing has subsided, and (2) extensible seals $92_1$, $92_2$ are provided, essentially as described by reference to FIG. 11A. It differs from previous embodiments described herein, inter alia, in that abuttments are provided in lieu of AB gate pairs.

The engine 100 thus includes a rotor 93, of circular design, affixed upon a shaft 94, which rotates within a stator 95 of noncircular cross-section. The ends of extensible seals $92_1$, $92_2$, located within end wall $97_1$, $97_2$, pass through rotating abuttments $96_1$, $96_2$, fuel being compressed within abuttment $96_1$ by advancing lobe $92_2$, and on passage through the abuttment the fuel is fired behind the face of the retreating lobe. Burned fuel is being forced through outlet 98 by approaching lobe $92_1$ and fuel is being taken in via inlet 99 behind receding lobe $92_2$.

It is apparent that various substitutions, modifications and changes, such as in location, or in the absolute or relative dimensions of the parts, materials used and the like, can be made without departing the spirit and scope of the invention as will be apparent to those skilled in the art.

Having described the invention, what is claimed is:

1. In a rotary engine for the intake and combustion of a fuel and air mixture which includes the combination of
   a stator formed by an outer casing,
   a rotor coaxially mounted and rotatable within said outer casing,
   a plurality of main chambers located within the annulus between the inside wall of the stator casing and external wall surface of the rotor, each being formed by lobes which extend from the external wall surface of the rotor into sliding contact with the inside wall of said stator casing, these including a main firing chamber,
   input means for the introduction of a gaseous combustible mixture of fuel and air into a main chamber of the engine,
   means for compressing and firing the fuel and air mixture within a primary firing chamber, the volume of the main firing chamber expanding as thrust is imparted by the combusting gaseous mixture to produce rotation of said rotor, and
   output means for the exhaust of the burned fuel from a main chamber of the engine,
   the improvement comprising
   minor chambers formed by recesses located within the inside wall of the stator for the incremental feeding of fuel admixtures into said main firing chamber and for the bypass of combusted fuel for admixture with fresh fuel and subsequent recycle to the main firing chamber, and wherein said main firing chamber is contoured to provide for an initial rapid increasing of the rate of volume expansion of combusting fuel to moderate the rise in temperature and suppress the formation of nitrous oxides, with a subsequent decreasing of the rate of volume expansion to sustain the moderated temperature and enhance a more complete combustion of the fuel, and then a subsequent increasing of the rate of volume expansion as combustion subsides to provide an increased area for receipt of generated forces through an elongated section to more fully utilize the forces produced.

2. The apparatus of claim 1 wherein the means for compressing and firing the fuel and air mixture within a primary firing chamber comprises a plurality of primary chambers located within the inside wall of the stator and open to the external surface of the rotor, each being located between the gates of a gate pair, each gate of a gate pair being independently extensible from the stator wall in alternate sequence, one gate extending following passage of a rotor lobe to effect a continuous contact with the external surface of the rotor between adjacent rotor lobes and to partition each main chamber into two volume portions, such that each primary chamber first forms a minimum final volume of compression in that portion of every alternate main chamber with decreasing volume, intake of fuel occurring in the increasing volume portion, and secondly a minimum initial volume of expansion in that portion of every other alternate main chamber with increasing volume, exhaust of burned gases occurring in the decreasing volume portion.

3. The apparatus of claim 2 wherein channels for the input of fuel and air, and for the exhaust of burned gases, are located within the gates.

4. A rotary internal combustion engine for the intake and combustion of fuel and air which, in combination, comprises
   a stator formed by an enclosing wall,
   a rotor journalled upon a shaft, coaxially mounted and rotatable within the stator,
   minor chambers formed by recesses located within the inside wall of the stator open to the external face of the rotor,
   a plurality of primary chambers located within the inside wall of the stator, each of which is open to the external surface
   of the rotor,
   a gate pair operatively associated with each of said primary chambers, one gate of each pair of which is located on opposite sides of said primary chambers, each gate of a pair being independently extensible from the wall of the stator for contact with the external surface of the rotor, the gate of each pair first approached by the rotor lobes as the rotor rotates being termed a firing and exhaust gate and the gate lastly approached by the rotor lobes being termed an intake and compression gate,
   means for the introduction of a gaseous combustible mixture of fuel and air into the engine,
   a plurality of main chambers within the annulus between the inside wall of the stator and external surface of the rotor formed by a plurality of separated rotor lobes which contact and seal with the inside wall of the stator and which lie such that areas between the lobes, and between the inside wall of the stator and external wall of the rotor, define said main chambers, inclusive of
   i. an intake and compression main chamber, which section of the outside surface of the rotor is contacted in a continuous sweep as the intake and compression gate of each gate pair in turn extends to partition the chamber into two portions such that the space between the gate and the receding rotor lobe, termed an intake and exhaust lobe, is increasing, creating a suction for the intake of a fuel mixture, and the space between the gate and the approaching rotor lobe, termed a compression and firing lobe, is decreasing and a fuel mixture is being compressed into minor recesses on passage of the compression and firing lobe, and into the primary chamber operatively associated with the intake and compression gate, wherein the fuel mixture is isolated as the gate continues its sweep up the face of the approaching compression and firing lobe and said lobe covers the opening of the primary chamber, the fuel mixture thus compressed having been taken into the intake and compression chamber as it passed the previous intake and compression gate, and ii. A firing and exhaust main chamber, which section of the outside surface of the rotor is contacted in a continuous sweep as the firing and exhaust gate of each gate pair in turn extends to partition the chamber into two portions such that the space between the gate and the approaching lobe, termed an intake and exhaust lobe, is decreasing, forcing burned fuel contained therein from the previous firing to be exhausted from the chamber, and the space between the gate and the receding lobe, termed a compassion and firing lobe, is forced to increase, imparting rotation to the rotor, by the expansive forces of a burning fuel mixture which is fired within the primary chamber, operatively associated with the firing and exhaust gate, as the receding compression and firing lobe uncovers said primary chamber and minor recesses, allowing open communication between the firing and exhaust main chamber and said minor recesses and primary chamber, wherein the fuel mixture was previously compressed and isolated, the contour of the firing and exhaust main chamber providing an initial rapid increasing of the rate of volume expansion to moderate the rise in temperature and suppress the formation of nitrous oxides, with a subsequent decreasing of the rate of volume expansion to sustain the moderated temperature and enhance a more complete combustion, and then a subsequent increasing of the rate of volume expansion as combustion subsides to provide an increased area for receipt of generated forces through an elongated section to more fully utilize the forces produced.

5. The apparatus of claim 4 wherein gates, other than the gate pairs associated with the primary chambers, are located between said primary chambers for partitioning of the minor recesses.

6. The apparatus of claim 4 wherein the engine comprises four primary chambers, a rotor provided with four lobes inclusive of compression and firing lobes and intake and exhaust lobes, and a plurality of the minor recesses are located within the stator wall between each of the primary chambers.

7. The apparatus of claim 4 wherein gates, other than the gate pairs associated with the primary chambers, are located between said primary chambers, partitioning the minor recesses, and the minor recesses are pressure responsive, the pressure responsive minor recesses being located between the primary chambers for the intake of a multiple number of components, the minor recesses opening in response to pressure, as compression and firing lobes approach and pass, to store admixtures of fuels and other components for subsequent use, and remain closed as intake and exhaust lobes approach and pass.

8. The apparatus of claim 7 wherein the gates, other than those associated with the primary firing chambers, include channels for the intake of fuel, and fuel is taken in through a gate channel on passage of an intake and exhaust lobe and subsequently compressed into a transfer manifold through a gate channel on passage of a compression and firing lobe.

9. The apparatus of claim 7 wherein gates other than those associated with the primary firing chambers, include channels for the intake of inert materials into a main chamber through a gate channel on passage of an intake and exhaust lobe, subsequently compressed into the minor chambers and fed into a main firing chamber on passage of a compression and firing lobe, to increase the total expansion of the hot gases to more fully utilize the energy released.

10. The apparatus of claim 7 wherein gates, other than those associated with the primary firing chambers, include exhaust channels, and the exhaust channels are periodically communicated with an exhaust transfer manifold for exhaust recycling external to the engine.

11. The apparatus of claim 7 wherein a suction is caused initially between a gate and a receding intake and exhaust lobe, and finally between said first gate and a second gate, other than those associated with the primary firing chambers, for the intake of fuel components which are subsequently compressed into minor recesses located between said first and second gates on the approach of a compression and firing lobe, the components being fed incrementally into a main firing chamber on passagee of said compression and firing lobe.

12. The apparatus of claim 11 wherein the intake channel communicates in turn with a series of external manifolds, allowing intake and admixture of multiple components.

13. The apparatus of claim 11 wherein the intake of fuel components occurs within the space between a first and second gate and also within the space between the second and a third gate, other than those associated with the primary firing chambers, said second gate subsequently retracting to allow the two areas to communicate and the components contained therein to admix.

14. A rotary internal combustion engine for the intake and combustion of fuel and air which, in combination, comprises a stator of substantially circular cross-section, with separated bulged sectors which deviate from the said circular cross-section, formed by an enclosing wall, a rotor, provided with a plurality of separated lobes, journalled upon a shaft, coaxially mounted and rotatable within the stator, a plurality of primary chambers located within the inside wall of the stator, each of which can be opened to the external surface of the rotor, a gate pair operatively associated with each of said primary chambers, one gate of each pair of which is located on opposite sides of said primary chambers, each gate of a pair being independently extensible from the wall of the stator in alternate sequence for contact with the external surface of the rotor, a plurality of minor recesses located between the primary chambers within the inside wall of the stator that can be opened for receiving and storing of gases for bypass and incremental feeding from one main chamber into a following main chamber on passage of a rotor lobe, and a plurality of gates, in addition to the gate pairs, located between the primary chambers, a plurality of main chambers within the annulus between the inside wall of the stator and the external surface of the rotor formed by the plurality of separated rotor lobes, said lobes inclusive of i. alternate rotor lobes of a first series of which, termed compression and firing lobes, contain extensible seal members which contact and seal with both the circular cross-section and the bulged sectors on the inside wall of the stator, forming between any two said lobes, and between the inside wall of the stator and external surface of the rotor, a combination of main chambers including an intake and compression main chamber and a firing and exhaust main chamber, providing for the four engine functions to intake, compression, firing and exhaust, and on extension of a gate of a gate pair into contact with the external surface of the rotor from a primary chamber while the opposite gate of the pair, closed to the approaching forward face of an approaching compression and firing lobe, remains retracted, fuel is compressed and sealed within said primary chamber by the physical presence of said arriving lobe, at which time the extended gate of said primary chamber is retracted and the opposite gate of the pair is extended behind the trailing face of said compression and firing lobe, after which time the compressed fuel within said primary chamber is fired, the burning gas rapidly expanding at the inception of the firing into a main firing chamber, associated with a firing and exhaust chamber, imparting thrust to the rotor via action of the gases expanding against the extended gate affixed to the stator wall, and against the trailing face of said lobe, the contour of the main firing chamber, formed by a combination of stator bulged sectors and the non-circular rotor, being such as to provide an initial rapid increasing of the rate of volume expansion to moderate the rise in temperature and suppress the formation of nitrous oxides, with a subsequent decreasing of the rate of volume expansion to sustain the moderated temperature and enhance a more complete combustion, and then a subsequent increasing of the rate of volume expansion as combustion subsides to provide increased areas for receipt of generated forces through an elongated sector to more fully utilize the forces produced, and ii. alternate rotor lobes of a second series of which, termed intake and exhaust lobes, contact and seal with the circular cross-section of the inside wall of the stator, periodically separating the firing and exhaust main chamber from the intake and compression main chamber, but do not contact nor seal with the bulged sectors of the inside wall of the stator, periodically allowing communication between the firing and exhaust main chamber and the intake and compression main chamber and bypassing a portion of the spent gases from a previous firing for subsequent recycle, and on extension of a gate of a gate pair into contact with the external surface of the rotor from a primary chamber while the opposite gate of the pair, farthest from the approaching forward face of an approaching intake and exhaust lobe, remains retracted, spent gases are forced out through an exhaust port by the physical presence of said arriving lobe, at which time the extended gate of said primary chamber is retracted and the opposite gate of the pair is extended behind the trailing face of said intake and exhaust lobe for subsequent compression of fuel previously taken in as a gate, not of a gate pair, extended down the trailing face of said intake and exhaust lobe, said gate then retracting to allow the fresh fuel taken in to be admixed with spend gases being swept before the following compression and firing lobe.

15. The apparatus of claim 14 wherein a plurality of separately extensible gates are located between the gate pairs associated with the primary chambers.

16. The apparatus of claim 14 wherein is included additional alternate rotor lobes of a third series which contain extensible seal members, and additional alternate rotor lobes of a fourth series which do not contain extensible seal members, rotor lobes of each series occurring every fourth lobe, such that alternate combinations of main chambers of a first series of combinations of main chambers between lobes with extensible seals provide for intake, compression, firing and exhaust, while alternate combinations of main chambers of a second series of combinations of main chambers between lobes with extensible seals provide only for intake, compression and firing, the spent gases from firings behind rotor lobes in the said third series of lobes being bypassed within a bulged sector of the stator wall by lobes in the said four series of lobes for recycle, admixture with fresh fuel and refiring behind lobes of the said first series of lobes.

17. The apparatus of claim 16 wherein is included additional alternate rotor lobes of a fifth series which contain extensible seal members, and additional rotor lobes of a sixth series which do not contain extensible seal members, rotor lobes of each series occurring every sixth lobe, such that alternate combinations of main chambers of a first series of combinations of main chambers between lobes with extensible seals provide for intake, compression, firing and exhaust, while alternate combinations of main chambers of a second series of combinations of main chambers between lobes with extensible seals and alternate combinations of main chambers of a third series of combinations of main chambers between lobes with extensible seals provide only for intake, compression and firing, the spent gases from firings behind rotor lobes of said third series of lobes being bypassed within a bulged sector of the stator wall by rotor lobes in the said fourth series of lobes for recycle, admixture with fresh fuel and refiring behind rotor lobes of the said fifth series of lobes, the spent gases from the firings behind lobes of said fifth series of lobes being bypassed within a bulged sector of the stator wall by rotor lobes in the said sixth series of lobes for recycle, admixture with fresh fuel and refiring behind rotor lobes of the said first series of lobes.

18. The apparatus of claim 17 wherein the engine comprises a rotor with six lobes, one lobe of each of the said series of lobes, four primary chambers with associated gate pairs, four bulged sectors in the stator wall, minor recesses between the primary chambers and a plurality of gates between the primary chambers.

19. The apparatus of claim 14 wherein the minor chambers and primary chambers are opened and closed by mechanical means.

20. The apparatus of claim 14 wherein channels for the input of fuel and air, and for the exhaust of burned gases, are located within the gates.

21. The apparatus of claim 14 wherein the extensible seals within the lobes are provided with a counterpoise to offset their centrifugal forces, increments of mass being added to the counterpoise as the extensible seal extends, such that, as each weight comes to bear on the counterpoise, the centrifugal force of the extensible seal is exactly counterbalanced, the increments of mass being forced outward to the ends of their respective guide grooves until acted upon and forced inward by the counterpoise.

* * * * *